United States Patent
Shigeta

(10) Patent No.: US 8,244,289 B2
(45) Date of Patent: Aug. 14, 2012

(54) COMMUNICATION APPARATUS, COMMUNICATION CONTROL METHOD, AND INFORMATION DISPLAY METHOD

(75) Inventor: Saya Shigeta, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 763 days.

(21) Appl. No.: 12/090,243

(22) PCT Filed: Oct. 16, 2006

(86) PCT No.: PCT/JP2006/320565
§ 371 (c)(1),
(2), (4) Date: Mar. 12, 2009

(87) PCT Pub. No.: WO2007/043681
PCT Pub. Date: Apr. 19, 2007

(65) Prior Publication Data
US 2009/0264144 A1  Oct. 22, 2009

(30) Foreign Application Priority Data

Oct. 14, 2005  (JP) ................................. 2005-300225
Dec. 27, 2005  (JP) ................................. 2005-375602

(51) Int. Cl.
*H04M 1/725*  (2006.01)
*H04M 3/42*  (2006.01)
*H04B 7/00*  (2006.01)

(52) U.S. Cl. ........ 455/517; 455/518; 455/519; 455/416; 455/412.1

(58) Field of Classification Search .................. 455/517, 455/518, 519, 521
See application file for complete search history.

(56) References Cited

U.S. PATENT DOCUMENTS 6,915,138 B2 * 7/2005 Kraft .............................. 455/466
(Continued)

FOREIGN PATENT DOCUMENTS

JP  04-286217  10/1992
(Continued)

OTHER PUBLICATIONS

English translation of Korean office action dated Aug. 31, 2010 for corresponding Korean application 20087011520 lists the references above.

(Continued)

*Primary Examiner* — Tilahun B Gesesse
(74) *Attorney, Agent, or Firm* — DLA Piper LLP (US)

(57) ABSTRACT

In a case where a PTT start notification is received at a communication part 102, a PTT application for executing processing concerning PTT communication is started up, and an instruction for starting the PTT communication is not input to a key input part 103 for a predetermined time, the PTT application automatically ends and predetermined flag data fg is stored in an external data storage region AR1. After that, when the PTT application is not started up, a notification of reception of an absent signal indicating no reply to the PTT start notification is reported based on the flag data fg stored in the external data storage region AR1. Further, in an automatic reply mode, when PTT communication which automatically started in response to the PTT start notification ends, the reception of a PTT communication start notification of no reply, that is, reception of an absent signal, is suitably reported to a user based on presence/absence of transmission of information from the communication part 102 in the communication apparatus itself at a and input of an instruction at the key input part 103.

23 Claims, 13 Drawing Sheets

U.S. PATENT DOCUMENTS

| | | |
|---|---|---|
| 6,984,206 B2 | 1/2006 | Kumei et al. |
| 7,206,594 B2 * | 4/2007 | Shostak .................. 455/519 |
| 7,636,339 B2 * | 12/2009 | Shaffer et al. ............. 370/338 |
| 7,639,634 B2 * | 12/2009 | Shaffer et al. ............. 370/266 |
| 8,085,671 B2 * | 12/2011 | Shaffer et al. ............. 370/237 |
| 2003/0153341 A1 | 8/2003 | Crockett et al. ............ 455/519 |
| 2005/0181815 A1 * | 8/2005 | Shostak .................. 455/519 |

FOREIGN PATENT DOCUMENTS

| | | |
|---|---|---|
| JP | 2001-077907 | 3/2001 |
| JP | 2003-174520 | 6/2003 |
| JP | 2005522067 A | 7/2005 |

OTHER PUBLICATIONS

Chinese language office action dated Dec. 14, 2010 and its English language translation for corresponding Chinese application 200680047511.2.

* cited by examiner

COMMUNICATION APPARATUS, COMMUNICATION CONTROL METHOD, AND INFORMATION DISPLAY METHOD

CROSS-REFERENCE TO THE RELATED APPLICATIONS

This application is a national stage of international application No. PCT/JP2006/320565 filed Oct. 16, 2006, which also claims benefit of priority under 35 U.S.C. §119 to Japanese Patent Application No. 2005-300225 filed Oct. 14, 2005 and Japanese Patent Application No. 2005-375602 filed Dec. 27, 2005, the entire contents of all of which are incorporated herein by reference.

TECHNICAL FIELD

The present invention relates to a communication apparatus for performing PTT (push to talk) and other group communications and a communication control method and an information display method of the same, more particularly relates to a communication apparatus provided with a function of reporting reception of a "no reply" signal when there is no response to a call signal.

BACKGROUND ART

In general, a mobile phone is provided with a function of notifying a user of reception of a "no reply" signal (absent signal) when a call signal is received, but not responded to. For example, "absent signal received" or another message may be displayed near the center of a standby screen, reception of an absent signal may be displayed by using a graphic referred to as a "pict" in a dedicated region of an upper portion or lower portion of the screen, or an LED or other light emitting device may be turned on to notify the user of the reception of the absent signal.

Further, when there is not only reception of call, but also reception of e-mail (reception of new mail), the reception of the e-mail is notified to the user by the same method as that in the case of a call.

The display of reception of an absent signal as described above is usually erased by the user performing a predetermined confirmation operation. For example, in the case of a call, the display is erased by displaying a screen of a call record, while in the case of e-mail, the display is erased by receiving new mail from a server and displaying that received mail on the screen. Even when the user performs an operation different from that, the display of the reception of the absent signal is not erased.

Further, in many mobile phones, buttons for directly shifting to the call record or mail reception screens are displayed as soft keys together with messages of reception of an absent signal. When a user depresses a button corresponding to this display to shift to these screens, the message of reception of an absent signal is erased from the standby screen.

But recently, the modes of communication of phones have become more diversified. Phones capable of performing, in addition to conventional audio speech by line switching, packet communication utilizing IP (Internet Protocol) networks are being widely utilized. For example, there is "chat mail" for performing conversation by mobile phones exchanging text in real time (see Patent Document 1). Chat mail is one of the modes of communication called as "group communication" where members who are registered in advance form a group and exchange text and other data in real time in the group.

Further, as one type of group communication attracting attention recently, there is the one called PTT (push to talk) or PoC (push to talk over cellular). In PTT, a plurality of communication apparatus forming a group engage in audio speech with each other according to VoIP (voice over Internet Protocol) (see Patent Document 2).

In PTT group communication, a user who desires to speak pushes a predetermined button (PTT button) which is provided at the communication apparatus whereby a request to speak of the user is transmitted to a server apparatus. The server apparatus receives the requests to speak from the communication apparatus and gives a right to speak to one communication apparatus. The communication apparatus given the right to speak transmits audio data of the user to the server apparatus, then the server apparatus transmits that audio data to the other communication apparatus all together. Due to this, the plurality of communication apparatus forming the group engage in audio speech in real time.

Further, a mobile phone performing PTT communication executes processing concerning PTT communication according to a PTT communication application program. This application program is manually started by an instruction of the user or is automatically started up when there is reception of a PTT signal (reception of notification of hosting PTT communication by an e-mail etc.)

Further, when the PTT communication application program is automatically started up in response to the reception of a signal, the reception of the PTT signal is informed to the user by a report sound etc. At this time, if an instruction of the user is input by operation of a speech button etc. so as to participate in the PTT communication, the application program transmits a reply indicating participation in PTT communication to the server apparatus and starts PTT communication. On the other hand, when the instruction of the user is not input for a predetermined time or longer, the application program autonomously ends without transmitting a participation reply.

Patent Document 1: Japanese Patent Publication (A) No. 2003-174520
Patent Document 2: Japanese Patent Publication (A) No. 2005-522067

DISCLOSURE OF THE INVENTION

Problems to be Solved by the Invention

When there is reception of a "no reply" signal in PTT communication (reception of absent signal in PTT communication), however, a record of that signal reception is stored in a local storage region managed by the application program. Usually, the storage region dedicated to this application cannot be freely accessed from other programs. For this reason, when the application program autonomously ends and the processing shifts to another program displaying a standby screen, that program has no way of learning of reception of an absent signal in PTT communication. As a result, in a mobile phone performing PTT communication, there is the inconvenience that the display of the reception of an absent signal as explained above cannot be carried out.

Further, even if the application program of PTT communication ends, then an "absent signal received" display of PTT communication is left on the screen, another program performing processing after that (for example, an application program for displaying the standby screen) does not allow instruction of the user concerning PTT communication to be input since the processing concerning PTT communication has ended. Namely, in the state where the application program of the PTT communication has ended, it cannot be judged if information of the reception of an absent signal of PTT is being correctly transmitted to the user, therefore the display of the notification of reception of an absent signal cannot be suitably suspended.

Further, usually a reply of participation in PTT communication is not transmitted unless an instruction of the user is input. However, in for example a case where PTT communication must be carried out at all times, it is sometimes more preferred to start the PTT communication by automatically transmitting a participation reply even when there is no instruction of the user.

However, if ending up automatically starting PTT communication, it is unclear whether the start of the PTT communication would be learned by the user. Therefore, there is the inconvenience that a proper display of reception of an absent signal cannot be carried out after the end of PTT communication.

Namely, if not displaying reception of an absent signal at all times in the case of automatically starting PTT communication, there is a possibility that the user will not notice that there was reception of a PTT signal at all. At this time, if conversely assuming display of reception of an absent signal at all times, there would be the problem that unnecessary display of reception of an absent signal would be carried out for already known PTT communication.

The present invention was made in consideration with such a circumstance and has as its object to provide a communication apparatus which is able to display to a user the fact of no reply to a start notification even after a program for executing processing concerned data communication ends in a case where a start notification of PTT or other data communication is received but not replied to.

Further, the present invention provides a communication apparatus and an information display method which is able to suitably suspend display to the user of the fact of no reply to a start notification of data communication at a time when a program for executing processing concerned the data communication is not yet started up.

Further, another object of the present invention is to provide a communication apparatus which is able to suitably report the reception of a start notification in a case where PTT or other group communication started in response to the start notification ends and a communication control method of the same.

Means for Solving the Problems

A communication apparatus of a first aspect of the present invention comprises a communication part performing data communication, a display part displaying information, an input part inputting an instruction, a storage part, and a control part able to execute a control for starting up a first program for executing processing relating to the data communication when the communication part receives a start notification of data communications, a control for ending the first program and storing first data in the storage part, when any input from the input part for starting data communications has not been generated for a predetermined time in a state where the first program is started up, and a control for displaying first information indicating no reply to the start notification on the display part in a case where the first data is stored in the storage part in a state where the first program is not started up.

The control part performs a control so that the first information is not displayed on the display part when the first program is ended after starting up the first program in response to a first startup instruction input from the input part during displaying the first information on the display part.

In this case, the control part stores second data in the storage part when starting up the first program in response to the first startup instruction, and prohibits the display of the first information in a state where the second data is stored in the storage part, and the first program is not started up.

Further, the control part makes the storage part store information of a sender of the start notification when storing the first data in the storage part, and may display the information of the sender stored in the storage part on the display part when starting up the first program in response to the first startup instruction.

Further, the control part makes the storage part store the information of the sender of the start notification linked with the first data when storing the first data in the storage part, displays the information of the sender stored in the storage part on the display part and stores third data in the storage part when a predetermined instruction input is further inputted from the input part after starting up the first program in response to a second startup instruction input from the input part, and prohibits the display of the first information in a state where the third data is stored in the storage part and the first program is not started up.

A communication apparatus according to a second aspect of the present invention comprises a communication part performing data communication, a display part displaying information, an input part inputting an instruction, and a control part, in a case of starting up a first program for executing processing concerning data communication by input from the input part during the display on the display part of first information indicating no reply to a start notification of data communication received at the communication parts performing control so as to prohibit the display of the first information after the end of the first program.

In the above first aspect and above second aspect, the control part can display information indicating no reply to the start notification on the display part based on the first-data stored in the storage part even in the state where the first program is executed.

A third aspect of the present invention relates to a communication apparatus provided with a communication part performing group communication, an input part inputting an instruction, a report part, and a control part starting group communication by the communication part via a predetermined server apparatus based on a start notification when receiving a start notification of group communication at the communication part. In this communication apparatus, the control part makes the report part report part when group communication started based on the received start notification ends and there is no information transmission from the apparatus itself by the communication part and/or input of an instruction in the input part during the started group communication.

Preferably, the control part starts to report that there was no input of a reply instruction with respect to the start notification in the input part, although the start notification was received.

Preferably, the control part can automatically start the processing of group communication by the communication part even without input of an instruction in the input part if receiving the start notification at the communication part.

Preferably, the communication apparatus according to the third aspect is provided with a storage part, and the control part makes the storage part store communication information transmitted and received at the communication part during the group communication and, when the group communication ends, judges presence/absence of the information transmission from the communication apparatus itself based on the communication information stored in the storage part.

The control part may judge that there was no information transmission from the communication apparatus itself when the communication information stored in the storage part does not include information transmitted from the communication apparatus itself.

Further, the communication information may include a sender name indicating the sender of the information during group communication, the storage part may store the user name of the communication apparatus, and the control part may judge that there was no information transmission from the communication apparatus itself when the user name is not included in the sender name in the communication information.

Data representing the sender name in the communication information may be restricted in data length to a predetermined value or less, and the control part may judge whether or not the user name is included in the communication information according to whether or not a sender name matching with the related user name at the forward part is included in the communication information if the data length of the user name stored in the storage part is longer than the predetermined value.

Preferably, the communication apparatus according to the third aspect is provided with a storage part, and the control part makes the storage part store information concerning an instruction input in the input part concerning group communication in progress and, when the related group communication ends, judges whether or not an instruction is input in the input part concerning the group communication based on the information stored in the storage part.

The control part may judge that an instruction is input in the input part concerning the group communication when the information stored in the storage part includes a reply instruction with respect to the start notification of group communication or information concerning an instruction input during group communication.

The control part may automatically end the group communication when predetermined conditions are established during group communication, and makes the report part report when the ended group communication was automatically started and there was no information transmission from the communication part in the communication apparatus itself or no input of an instruction in the input part concerning the group communication.

The predetermined conditions may be at least one of a case where an end notification of group communication is received in the communication part or a case where any transmission/reception of information concerning group communication is not carried out for a predetermined time or longer in the communication part.

The control part makes the report part report in a case where a plurality of group communications which were automatically started in response to the start notification end and there was no information transmission from the communication part in the communication apparatus itself or no input of an instruction in the input part concerning at least one of the plurality of group communications.

A communication apparatus according to a fourth aspect of the present invention is provided with a communication part performing group communication, an input part inputting an instruction, a storage part storing information, a report part, a group communication control part automatically starting group communication by the communication part when a start notification of group communication is received at the communication part, and a report control part for making the storage part store information concerning the sender of data transmitted and received during the group communication and/or information concerning an instruction input from the input part during the group communication when the group communication control part automatically starts the group communication, and for reporting by the report part that a start notification has been received when the automatically started group communication ends and information indicating participation in the group communication is not stored in the storage part.

A fifth aspect of the present invention relates to a server apparatus for performing communication with a plurality of communication apparatus including a communication apparatus according to the third aspect or fourth aspect explained above and managing group communication. This server apparatus transmits a start notification of group communication to a communication apparatus of a designated other party when another party is designated from one of the communication apparatus and the start of group communications is requested, starts the group communication when there is a reply of participation from any communication apparatus with respect to the start notification, and transmits an end notification to the communication apparatus of the designated other party when ending group communication being held.

A sixth aspect of the present invention relates to a communication control method in a communication apparatus provided with a communication part and an instruction input part and performing group communication by the communication part via a predetermined server apparatus based on a start notification when receiving the start notification of group communication by the communication part. In this communication control method, when the group communication ends without information transmission from the communication part in the communication apparatus itself or input of an instruction in the instruction input part concerning of the group communication started based on the start notification, a occurring of the reception of the start notification is reported.

EFFECT OF THE INVENTION

According to the present invention, where there is no reply to a start notification of data communication, the fact that there was no reply to the start notification of data communication can be notified to the user even after the program for executing the processing concerned the data communications ends due to the storage of predetermined data in the storage part.

Further, when displaying the fact of no reply to a start notification of data communication, by making the startup of the program for executing the processing concerning the data communication by an instruction of the user a condition of suspension of the display, the display can be suitably suspended when this program is not executed.

According to the present invention, when PTT or other group communication started in response to a start notification ends, the fact of reception of a start notification can be suitably reported based on presence/absence of information transmission from the communication apparatus itself or input of an instruction in the input part.

EXPLANATION OF NOTATIONS

101 . . . antenna, 102 . . . communication part, 103 . . . key input part, 104 . . . audio processing part, 105 . . . speaker, 106 . . . microphone, 107 . . . display part, 108 . . . storage part, 110 . . . control part, 111 . . . group communication control part, 112 . . . report control part, 100, 100-1 to 100-5 . . . communication terminals, 200 . . . communication management apparatus, and 300 . . . communication network.

BEST MODE FOR CARRYING OUT THE INVENTION

Figure 1:
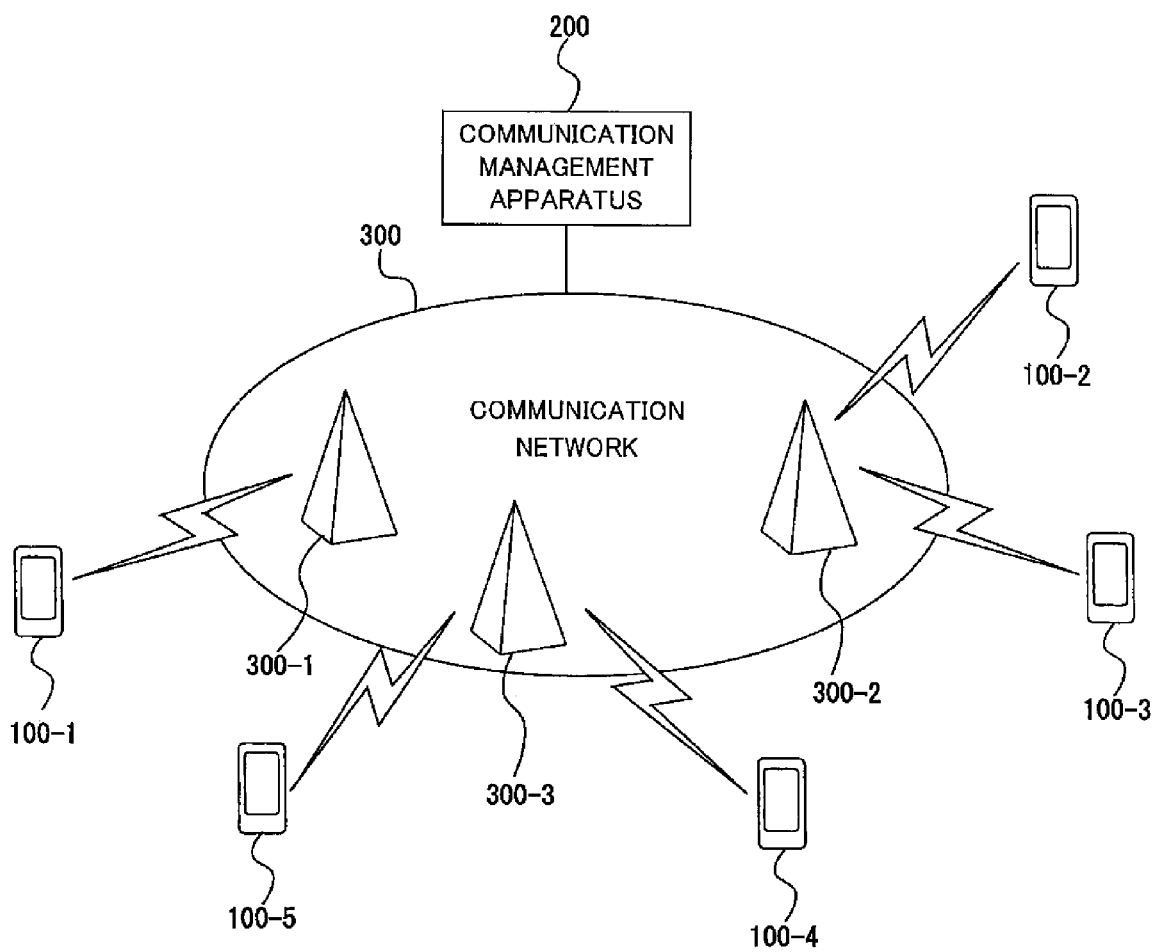
[FIG. 1] A diagram showing an example of the configuration of a communication system.

First, an example of a case where a record of communication in group communication is saved will be shown. FIG. 1 is a diagram showing an example of the configuration of a communication system of the present invention.

The communication system according to the present embodiment, for example as shown in FIG. 1, has communication apparatus 100-1 to 100-5 and a communication apparatus 200.

The communication apparatus 100-$i$ (i indicates an integer from 1 to 5) is for example a mobile phone or other wireless communication terminal connected to a communication network 300 via a base station (300-1, 300-2, and 300-3). Further, the communication apparatus 100-$i$ performs data communication under the control of the communication management apparatus 200 connected to the communication network 300. In the present embodiment, as an example, it is assumed that group communication by PTT (push to talk) (hereinafter sometimes called "PTT communication") is carried out. Data transmitted in PTT communication includes for example speech audio, images, text, music, and other data.

The communication apparatus 100-$i$, when performing PTT communication, is either an apparatus of the host starting the PTT communication (hereinafter sometimes called a "host terminal") or an apparatus participating in PTT communication by receiving the notification of start of PTT communication (hereinafter sometimes called a "participant terminal").

When the communication apparatus 100-$i$ itself becomes the host terminal and starts PTT communication, first, the communication apparatus 100-$i$ accesses the communication management apparatus 200, designates a plurality of other parties selected from an address book etc. stored in its own storage part, and requests the start of PTT communication. The communication management apparatus 200 receiving this request sets a site for the PTT communication management as will be explained later, whereupon the communication apparatus 100-$i$ acquires a network address of the site, log-in use ID, and other information from the communication management apparatus 200.

On the other hand, when receiving the start notification of PTT communication sent from the communication management apparatus 200, the communication apparatus 100-$i$ reports the reception of the start notification to the user by the report part generating for example an image, light, sound, vibration, or the like. At the time of reporting, when an instruction of participation in the PTT communication is input by for example a key operation of the user, the communication apparatus 100-$i$ transmits a reply indicating participation in the PTT communication to the communication management apparatus 200 and, at the same time, accesses the site for the communication management based on the information included in the start notification and starts PTT communication as a participant terminal.

The communication management apparatus 200 manages the group communication of PTT performed by the communication apparatuses (100-1 to 100-5).

When receiving the start request of the PTT communication issued from the host terminal, the communication management apparatus 200 provides a site for the PTT communication management on the communication management apparatus 200 (or another server apparatus on the network as well). This site manages information of each communication apparatus participating in the PTT communication, for example, a phone number and e-mail address, the participation and departure in/from the PTT communication by each communication apparatus, the transmission/reception of data between communication apparatuses, the issuance of a right to speak to a communication apparatus requesting to speak, and other various managements and controls concerning PTT communication.

When providing the site for the PTT communication management in response to the start request of PTT communication, the communication management apparatus 200 transmits the information of that site to the host terminal and, at the same time, transmits a start notification of PTT communication to each of the participant terminals designated in the start request of PTT communication. The start notification of PTT communication includes various types of information required for the participation in the PTT communication, for example, information such as a phone number and e-mail address of the host terminal of the PTT communication, a network address of the PTT communication management site explained above, log-in use ID, and so on.

When transmitting a start notification of PTT communication to the participant terminals, the communication management apparatus 200 monitors for the reply from each participant terminal with respect to this start notification and, when receiving a reply indicating the participation in PTT communication from at least one participant terminal, starts the PTT communication by this participant terminal and the host terminal.

When one communication apparatus participating in the PTT communication issues a request to speak (data transmission request) by for example pushing a PTT button, the communication management apparatus 200 gives the right to speak (data transmission right) to the one communication apparatus if there is no other communication apparatus in the middle of speaking (in the middle of data transmission). Namely, data (speech, text, etc.) sent from the one communication apparatus is received and transmitted to the other participating communication apparatuses. When there is another communication apparatus in the middle of speaking, a reply of rejection is returned back to the one communication apparatus. When there are overlapping requests to speak of several communication apparatuses, a priority sequence of communication apparatuses is determined according to a predetermined rule. For example, terminal which has spoken a smaller number of times is given a higher priority. The right to speak is given to communication apparatuses in order based on this.

When receiving an end request of the PTT communication issued by the host terminal, the communication management apparatus 200 transmits an end notification of PTT communication to each of the participant terminals and ends the PTT communication. In this case, the communication management apparatus 200 may transmit the end notification to not only the communication apparatuses participating in the PTT communication, but also communication apparatuses which do not participate and did not return a participation reply for the start notification of the PTT communication.

Next, the configuration of the communication apparatus will be explained.

Figure 2:
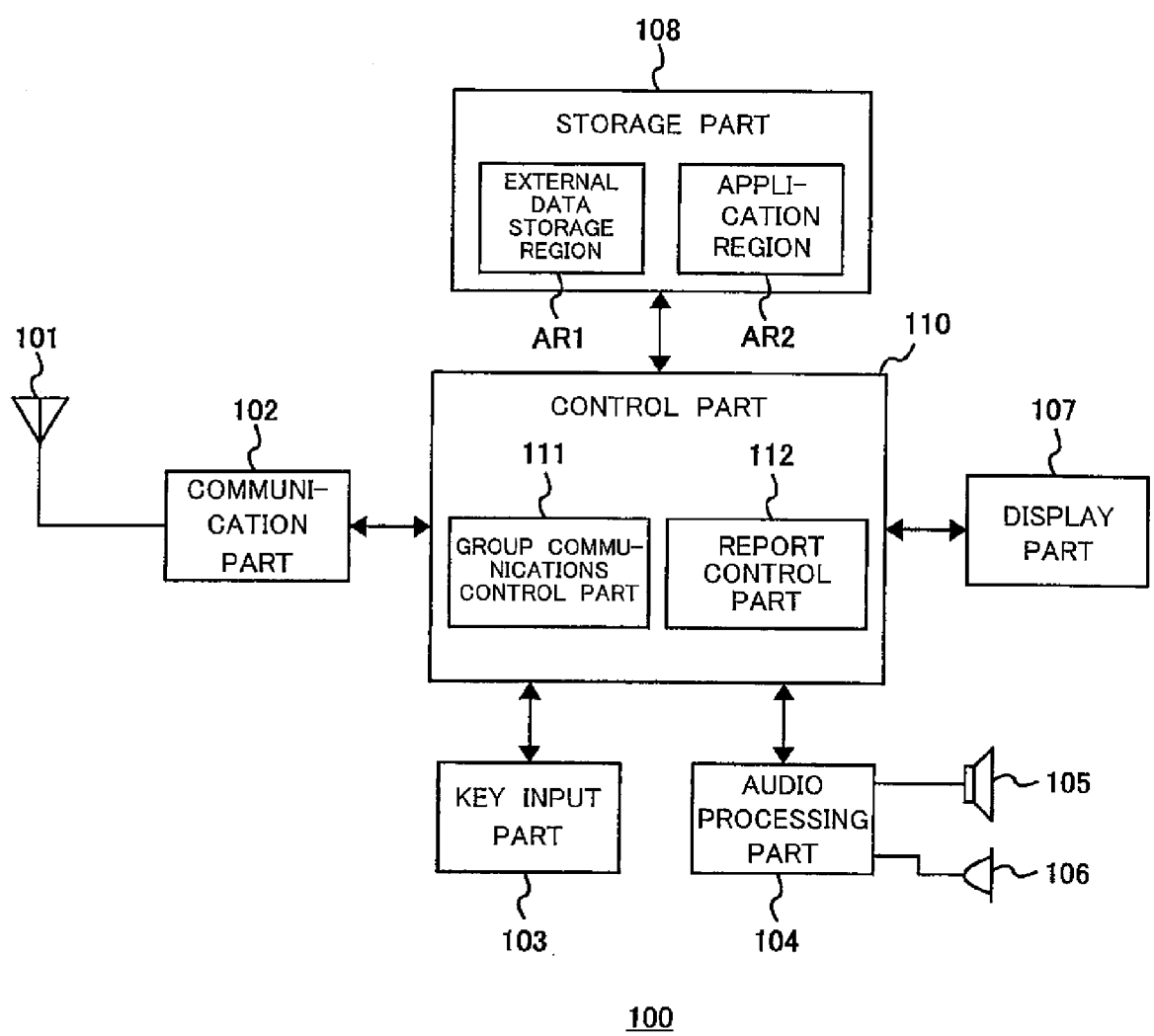
[FIG. 2] A diagram showing an example of the configuration of a communication apparatus shown in FIG. 1.

FIG. 2 is a diagram showing an example of the configuration of each communication apparatus (100-1 to 100-5) according to an embodiment of the present invention. Below, the communication apparatuses having the configuration shown in FIG. 2 will sometimes be called the "communication apparatus 100" all together.

The communication apparatus 100 shown in FIG. 2 has an antenna 101, a communication part 102, a key input part 103, an audio processing part 104, a speaker 105, a microphone 106, a display part 107, a storage part 108, and a control part 110.

The communication part 102 performs wireless communication with a base station (300-1, 300-2, and 300-3) connected to the communication network 300. For example, the communication part 102 applies a predetermined modulation processing to transmission data supplied from the control part 110 to convert this to a wireless signal and transmits the same from the antenna 101. Further, it applies a predetermined demodulation processing to a wireless signal from a base station received at the antenna 101 to convert this to reception data and outputs the same to the control part 110.

The key input part 103 has keys to which various functions are assigned, for example, a power key, speech key, number keys, character keys, direction keys, execute key, and PTT button. When any of these keys is operated by the user, the key generates a signal corresponding to the operation content which is then input as the instruction of the user to the control part 110.

The audio processing part 104 processes an audio signal output at the speaker 105 and an audio signal input at the microphone 106. Namely, it applies amplification, analog-to-digital conversion, encoding, or other signal processing to the audio signal input from the microphone 106, converts this to digital audio data, and outputs the same to the control part 110. Further, it applies decoding, digital-to-analog conversion, amplification, or other signal processing to the audio data supplied from the control part 110, converts this to an analog audio signal, and outputs the same to the speaker 105.

The display part 107 is configured by using a display part such as a liquid crystal display panel or organic EL panel and displays an image in accordance with a video signal supplied from the control part 110. For example, it displays a phone number of the call destination at the time of sending a call, a phone number of the other party in a call at the time of receiving a call, the content of received mail or transmitted mail, the date, the time, the remaining battery life, standby screen, and other various information and images.

The storage part 108 stores various types of data utilized for the processing in the control part 110. For example, it holds programs of a computer provided in the control part 110, an address book for managing phone numbers, e-mail addresses, and other personal information of the other parties of communication, an audio file for reproducing a received sound, an alarm sound, etc., various types of setting data, temporary data utilized in the processing steps of the program, and so on.

The storage part 108 has an external data storage region AR1 able to be accessed by any program and an application region AR2 able to be accessed by specific application programs. For example, an application program for executing processing concerning PTT communication (hereinafter called a "PTT application") stores the call record and other data which must be stored even after the end of the program in a dedicated region in the application region AR2.

The storage part 108 is configured by for example a nonvolatile storage apparatus (nonvolatile semiconductor memory, hard disc apparatus, optical disc apparatus, etc.), a randomly accessible storage apparatus (for example SRAM and DRAM), or the like.

The control part 110 centrally controls the overall operation of the communication apparatus 100. Namely, this controls the operations of the units explained above so that various types of processing of the communication apparatus 100 can be executed in a proper sequence in accordance with the operation of the key input part 103. As the various types of processing explained above, there are audio speech performed via the line switching network, group communication of PTT, preparation and transmission/reception of e-mails, reading of web sites of the Internet, and so on. Further, as the operations of the units, there are transmission/reception of signals in the communication part 102, input/output of audio in the audio processing part 104, display of images on the display part 107, and so on.

The control part 110 of an example storing a record of communication in group communications will be explained next.

For example, the control part 110 controls the input/output processing of audio in the audio processing part 104 and transmission/reception of signals for speech in the communication part 102 so that audio speech (speech passed through the line switching network, speech of VoIP passed through a packet switching network, etc.) according to predetermined protocols is suitably carried out. When performing group communication of PTT, the control part 110 starts up the PTT application.

Further, the control part 110 automatically starts up the PTT application when receiving a start notification of PTT communication (hereinafter called a "PTT start notification") at the communication part 102. Then, in the started up PTT application, the input of an instruction is waited for starting the PTT communication from the key input part 103. When there is no input of this instruction for a predetermined time, the control part 110 ends the started up PTT application and, at the same time, stores flag data fg1 (first data) indicating that the PTT start notification was not replied to (that is, there was an absent signal of PTT communication) in an external data storage region 108 of the storage part 108. Then, when the PTT application is not started up, information indicating that the PTT start notification was not replied to (hereinafter called a "notification of reception of an absent signal") is displayed on the display part 107 based on the flag data fg1 stored in the external data storage region 108.

When storing flag data fg1 indicating no reply to a PTT start notification in the external data storage region 108, the control part 110 stores information of the sender of this in the application region AR2.

The information concerning the sender of the PTT start notification which was not replied to will be called an "absent signal record" below. The absent signal record may include, in addition to the phone number and other information of the sender, information such as the date of sending.

The control part 110 performs processing for storing the absent signal record in the application region AR2 by the PTT application and, at the same time, performs processing for reading out the stored absent signal record and displaying this on the display part 107. The method of displaying the absent signal record on the display part 107 includes for example the following two methods.

In a first method, a predetermined instruction (first startup instruction) is input from the key input part 103 to start up the PTT application. The display processing of the absent signal record is automatically executed in that started up PTT application.

Namely, when starting up the PTT application in response to the first startup instruction, the control part 110 automatically reads out the absent signal record from the application region AR2 in this started up PTT application and displays this on the display part 107.

For example, when displaying "PTT reception occurs" or other notification of reception of an absent signal on the screen of the display part 107, the control part 110 displays a button representing a specific key of the key input part 103 (for example "OK" button on a screen L3 of FIG. 5) on the same screen as this. When this screen is displayed, if the above specific key is pushed by the user, the control part 110 will start up the PTT application, and the screen of the absent signal record will be automatically displayed in the related started up PTT application.

On the other hand, in a second method, after starting up the PTT application by inputting a predetermined startup instruction (second startup instruction) from the key input part 103, by further inputting a predetermined instruction from the key input part 103 in that started up PTT application, the display processing of the absent signal record is executed.

Namely, when the predetermined instruction is further input to the key input part 103 after the PTT application is started up in response to the second startup instruction input to the key input part, the control part 110 reads out the absent signal record from the application region AR2 and displays this on the display part 107.

For example, when a predetermined key (key menu) of the key input part 103 is pushed when the standby screen is displayed, the control part 110 displays a menu screen for selecting various functions on the display part 107. When the key input part 103 is operated so as to select the PTT application from this menu screen, the control part 110 judges this as the second startup instruction explained above and starts up the PTT application. When receiving this second startup instruction and starting up the PTT application, the control part 110 displays a menu screen for selection of further detailed functions concerning the PTT communication on the display part 107. When the key input part 103 is operated so as to display the absent signal record from this menu screen, the control part 110 reads out the absent signal record from the application region AR2 and displays this on the display part 107.

When displaying the notification of reception of an absent signal on the display part 107, if the control part 110 starts up the PTT application by the method as described above and displays the absent signal record, it suspends the display of the notification of reception of an absent signal after ending that PTT application.

For example, the data stored in the external data storage region 108 is used for the judgment of whether or not the notification of reception of an absent signal is to be erased from the screen of the display part 107 after the PTT application ends.

For example, when starting up the PTT application in response to the first startup instruction, the control part 110 displays the absent signal record on the display part 107 and, at the same time, stores a flag data fg2 indicating the display of the absent signal record in the external storage region AR1 of the storage part 108. Then, when the PTT application is not started up, it suspends the display of the notification of reception of an absent signal on the display part 107 based on the flag data fg2 stored in the external storage region AR1.

Further, for example, when further receiving as input the predetermined instruction from the key input part 103 after starting up the PTT application in response to the second startup instruction, the control part 110 displays the absent signal record on the display part 107 and, at the same time, stores a flag data fg3 indicating the display of the absent signal record in the external storage region AR1 of the storage part 108. Then, when the PTT application is not started up, it suspends the display of the notification of reception of an absent signal on the display part 107 based on the flag data fg3 stored in the external storage region AR1.

Note that the three flag data fg1 to fg3 explained above may be data independent from each other or may be common data. When these are common flag data fg, it can be judged whether or not the notification of reception of an absent signal is displayed when the PTT application is not yet started up in accordance with the value of that flag data fg. For example, where the PTT start notification is not replied to, the control part 110 sets the value of the flag data fig at "1", while the absent signal record is displayed, it sets the value thereof at "0". Then, when the PTT application is not started up, it displays the notification of reception of an absent signal when the value of the flag data fig is "1" and suspends the display of the notification of reception of an absent signal when that value is "0".

Here, the operation of the communication apparatus of the present invention having the configuration explained above will be explained by giving three examples.

First, a first example of the operation of the communication apparatus according to the present embodiment will be explained.

Figure 3:
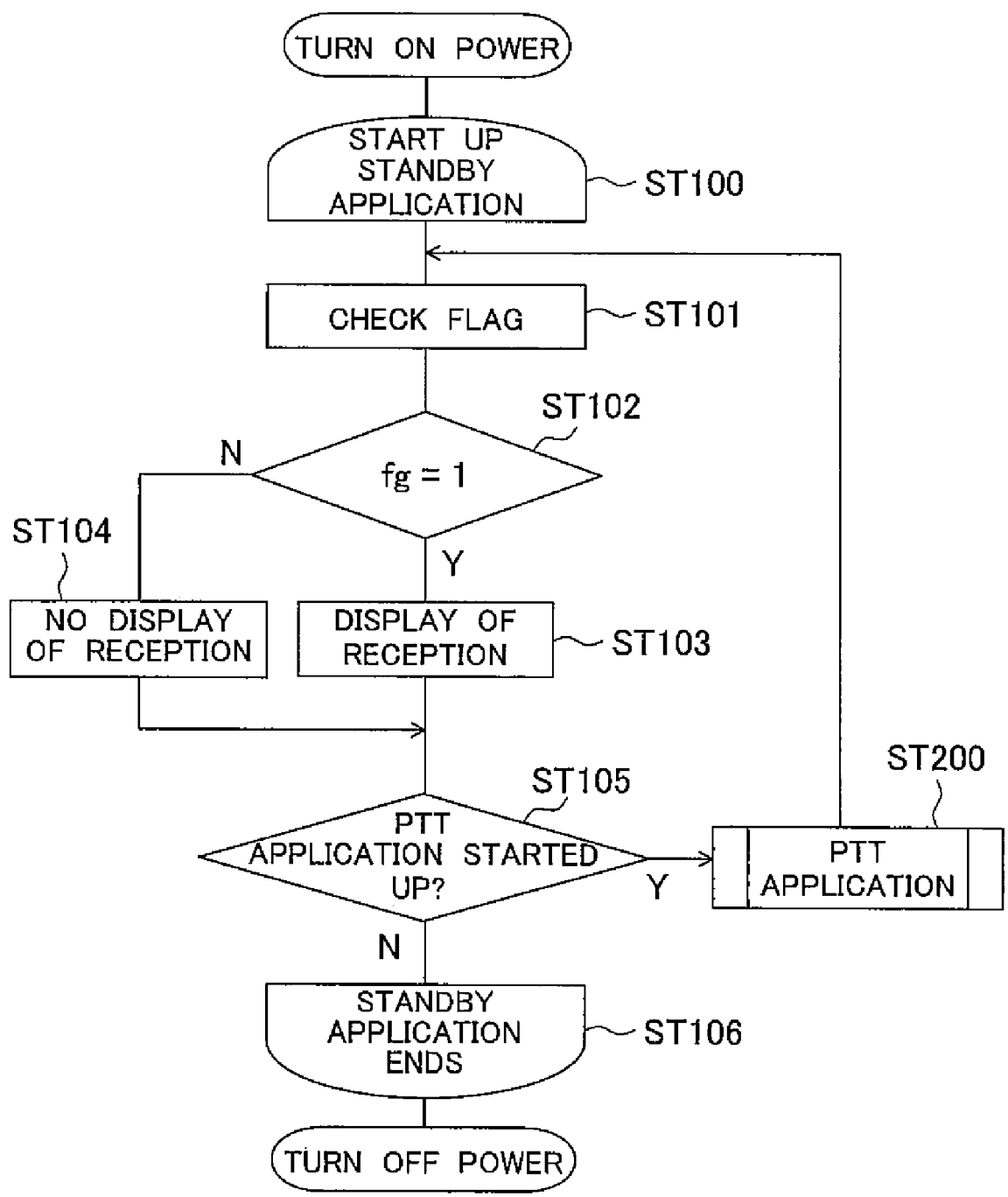
[FIG. 3] A flow chart showing an example of an operation for starting up a PTT application from a standby state.

FIG. 3 is a flow chart showing an example of the operation for starting up the PTT application from the standby state.

When the communication apparatus is powered up, the control part 110 starts up the application program for displaying the standby screen (hereinafter called a "standby application") on the display part 107.

In the started up standby application, the control part 110 checks the value of the flag data fg stored in the external data storage region AR1 (step ST101). When the value of the flag data fg is "1", the control part 110 judges that a no reply to the notification of PTT start has been received and displays the notification of reception of an absent signal on the screen of the display part 107 (step ST103). On the other hand, when the value of the flag data fg is "0", the notification of reception of an absent signal is erased from the screen of the display part 107 (step ST104).

When an event starting up the PTT application occurs during the execution of the standby application (step ST105), the control part 110 sets the standby application to the suspended state and starts up the PTT application (step ST200).

There are for example the following three events for starting up a PTT application.

The first event occurs when a PTT start notification is received at the communication part 102. In this case, the PTT application is automatically started up.

The second event occurs in a case where a specific key of the key input part 103 corresponding to the button (OK button) displayed on the standby screen is pushed when the notification of reception of an absent signal is to be displayed on the screen.

The third event occurs in a case where an instruction is input from the key input part 103 so as to start up the PTT application when a predetermined menu screen for selection of various functions is displayed in the standby application.

Figure 4:
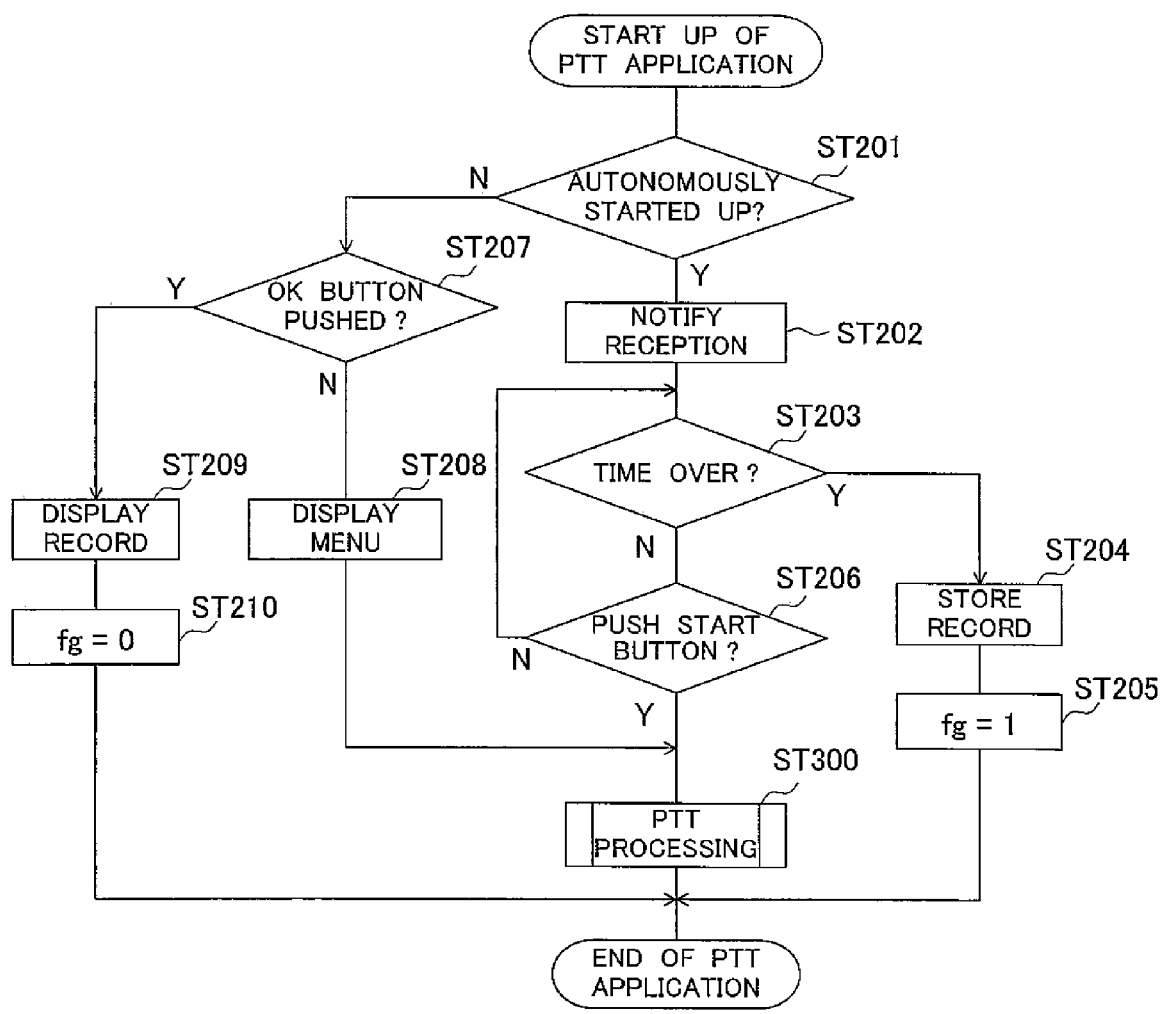
[FIG. 4] A flow chart showing a first example of operation of a communication apparatus at the time of startup of a PTT application.

FIG. 4 is a flow chart showing a first example of the operation of the communication apparatus at the time of the startup of the PTT application.

In the started up PTT application, the control part 110 judges the type of startup of the PTT application first (steps ST201 and ST207).

Namely, the control part 110 judges whether or not the PTT application is autonomously started up in accordance with the first event explained above (reception of PTT start notification) (step ST201). Further, when it is not an autonomous startup, it judges whether the PTT application was started up in accordance with the second event explained above (depression of the OK button on the screen of the notification of reception of an absent signal) or started up in accordance with the third event (selection of the PTT application in the menu screen of the standby application) (step ST207).

When the PTT application is autonomously started up in accordance with the first event, the control part 110 displays the fact that the PTT start notification was received on the display part 107 (step ST202). For example, "during PTT reception" or other message is displayed on the screen.

When receiving the PTT start notification, the control part 110 waits for the input of the start instruction of PTT communication (steps ST203 and ST206). When the predetermined key operation for indicating the start of PTT communication, for example, depression of a specific start button or receiver button, is carried out in the key input part 103 (step ST206), the control part 110 starts the PTT communication according to the PTT application (step ST300).

On the other hand, when the waiting time of the start instruction of PTT communication reaches a predetermined time, the control part 110 stores the absent signal record including information concerning the sender of the PTT start notification (phone number etc.) and information concerning the reception time in the application region AR2 (step ST204). Further, it sets the value of the flag data fg of the external data storage region AR1 at "1" (step ST205).

When the storage of the absent signal record and the setting of the flag data fg end, the control part 110 ends the PTT application and returns the standby application from the suspended state. In the restarted operating standby application, the value of the flag data fg has become "1", therefore the control part 110 displays the notification of reception of an absent signal on the display part 107 (step ST103).

When the PTT application is started up in accordance with the third event (selection of the PTT application in the menu screen of the standby application), the control part 110 displays the menu screen for selecting various functions of the PTT communication (hereinafter called a "PTT menu screen") on the display part 107 (step ST208). Then, it executes various types of processing of PTT communication in response to the instruction which is input to the key input part 103 in this PTT menu screen (step ST300).

In the case of startup in accordance with the second event (depression of the OK button on the screen of the notification of reception of an absent signal), the control part 110 automatically displays the screen of the absent signal record on the display part 107 without passing through the PTT menu screen explained above (step ST209). Further, it sets the value of the flag data fg of the external data storage region AR1 at "0" (step ST210).

When the display of the absent signal record and the setting of the flag data fg end, the control part 110 ends the PTT application and returns the standby application from the suspended state. In the restarted operating standby application, the value of the flag data fg has become "0", therefore the control part 110 suspends the display of the notification of reception of an absent signal (step ST104).

Figure 5:
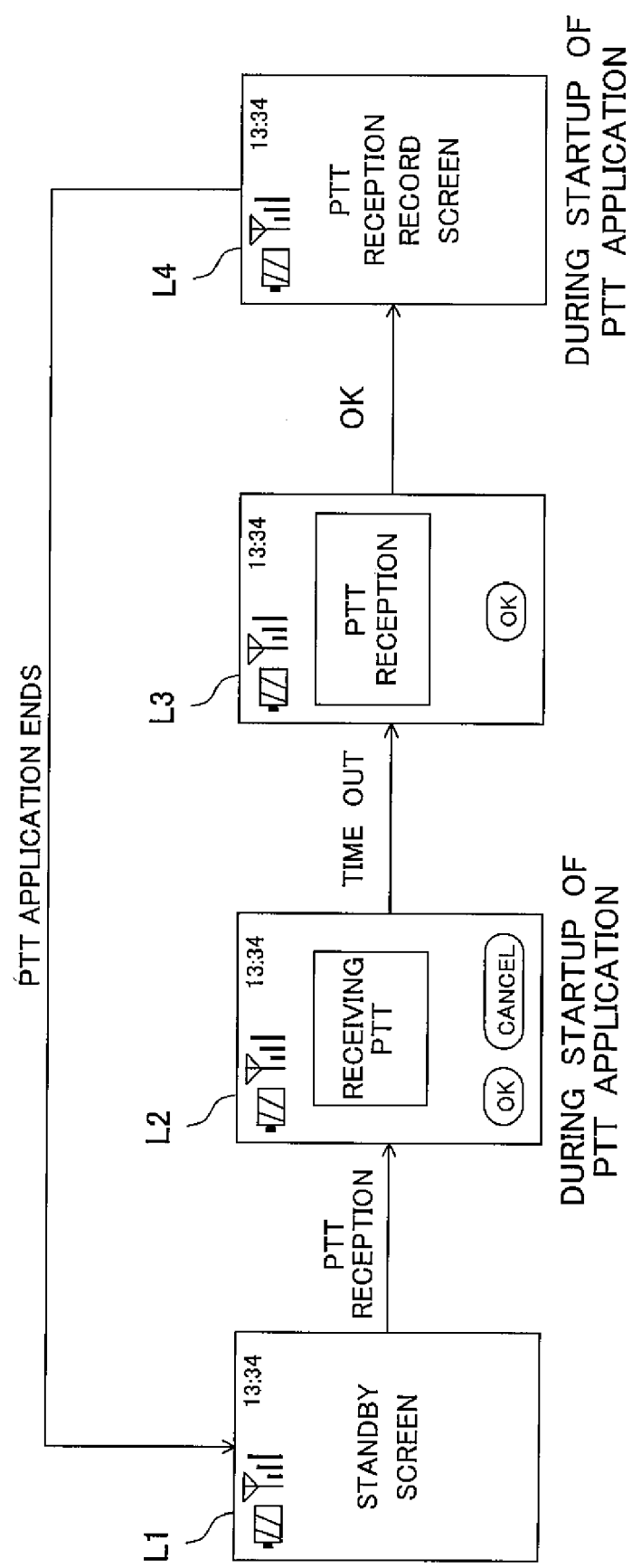
[FIG. 5] A diagram showing an example of a screen transition of a display part according to the first example of operation shown in FIG. 4.

FIG. 5 is a diagram showing an example of the screen transition of the display part 107 according to the first example of the operation explained above.

When the communication part 102 receives a PTT start notification at the time of standby (screen L1), the PTT application is started up and "during PTT reception" or another message is displayed on the screen of the display part 107 (screen L2).

When the user does not reply to this PTT reception, after a predetermined time passes, the PTT application autonomously ends. After the end of the PTT application, "PTT reception occurs" or other notification of reception of an absent signal is displayed on the screen of the display part 107 (screen L3).

When the user depresses a specific key of the key input part 103 in accordance with the display of the "OK button" on this screen L3, the PTT application is started up and the screen of the absent signal record is displayed on the display part 107 (screen L4).

After the display of the screen of the absent signal record, when this screen is closed by the operation of the user, the PTT application ends, and the screen returns to the screen L1 from which the notification of reception of an absent signal was erased.

This is an explanation of the first example of the operation.

Next, a second example of the operation of the communication apparatus according to the present embodiment will be explained.

Figure 6:
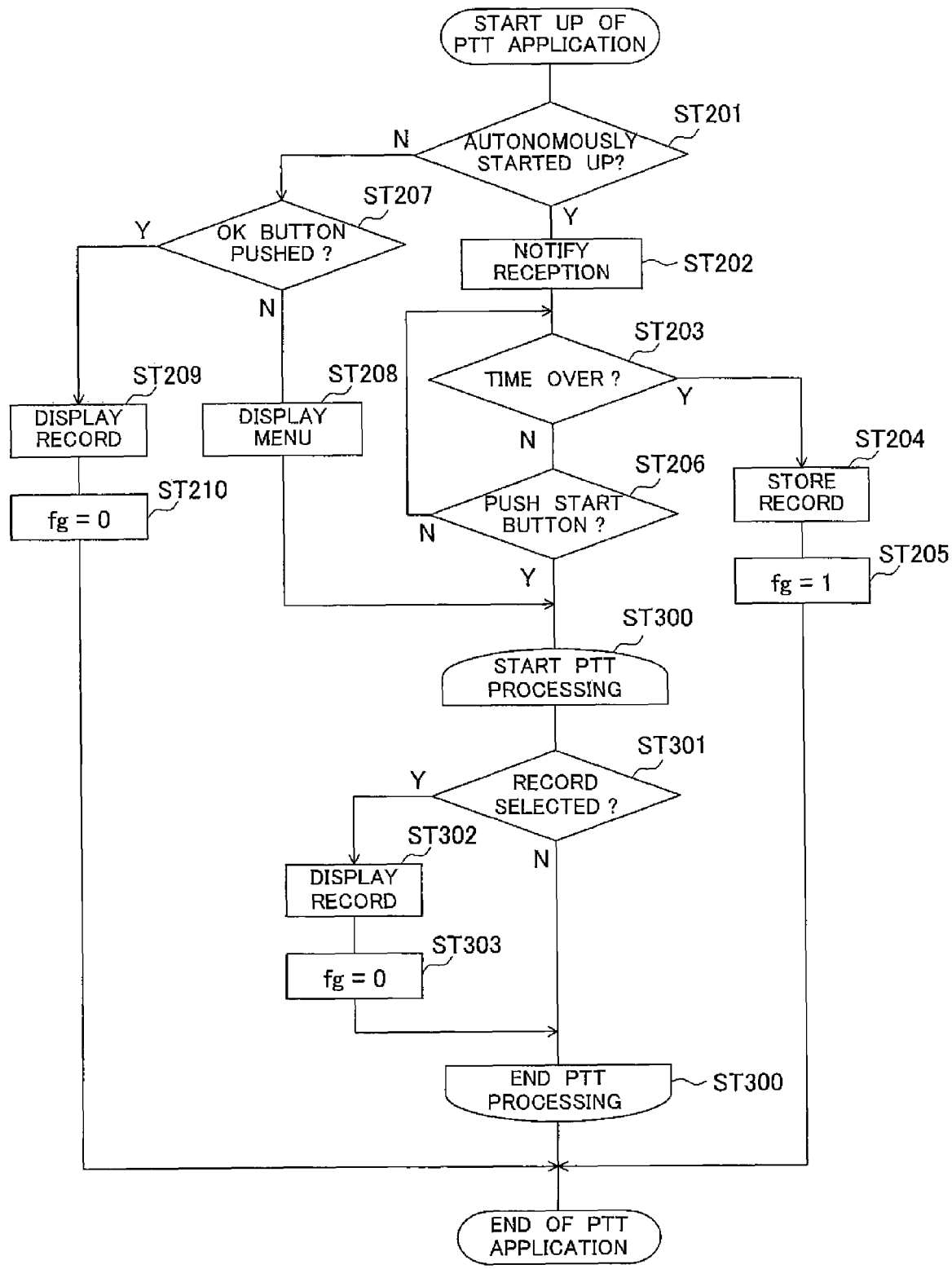
[FIG. 6] A flow chart showing a second example of operation of a communication apparatus at the time of startup of a PTT application.

FIG. 6 is a flow chart showing a second example of the operation of the communication apparatus at the time of the startup of the PTT application. The difference of this from the first example of the operation shown in FIG. 4 resides in a point that the value of the flag data fg is set at "0" when the display of the absent signal record is carried out during the processing of the PTT application in step ST300. The processing in the standby application is the same as that of the flow chart of FIG. 3.

In the processing of the PTT application which is executed after the menu display (step ST208) and the depression of the start button (step ST206), etc, predetermined key operation for instructing to display the absent signal record is made with respect to the key input part 103 (step ST301). Then, the control part 110 reads out the absent signal record stored in the application region AR2 and displays this on the display part 107 (step ST302) and, at the same time, sets the value of the flag data fg of the external data storage region AR1 at "0" (step ST303). After that, when the PTT application ends and the standby application returns from the suspended state, since the value of the flag data fg has become "0", the control part 110 suspends the display of the notification of reception of an absent signal (step ST104).

Figure 7:
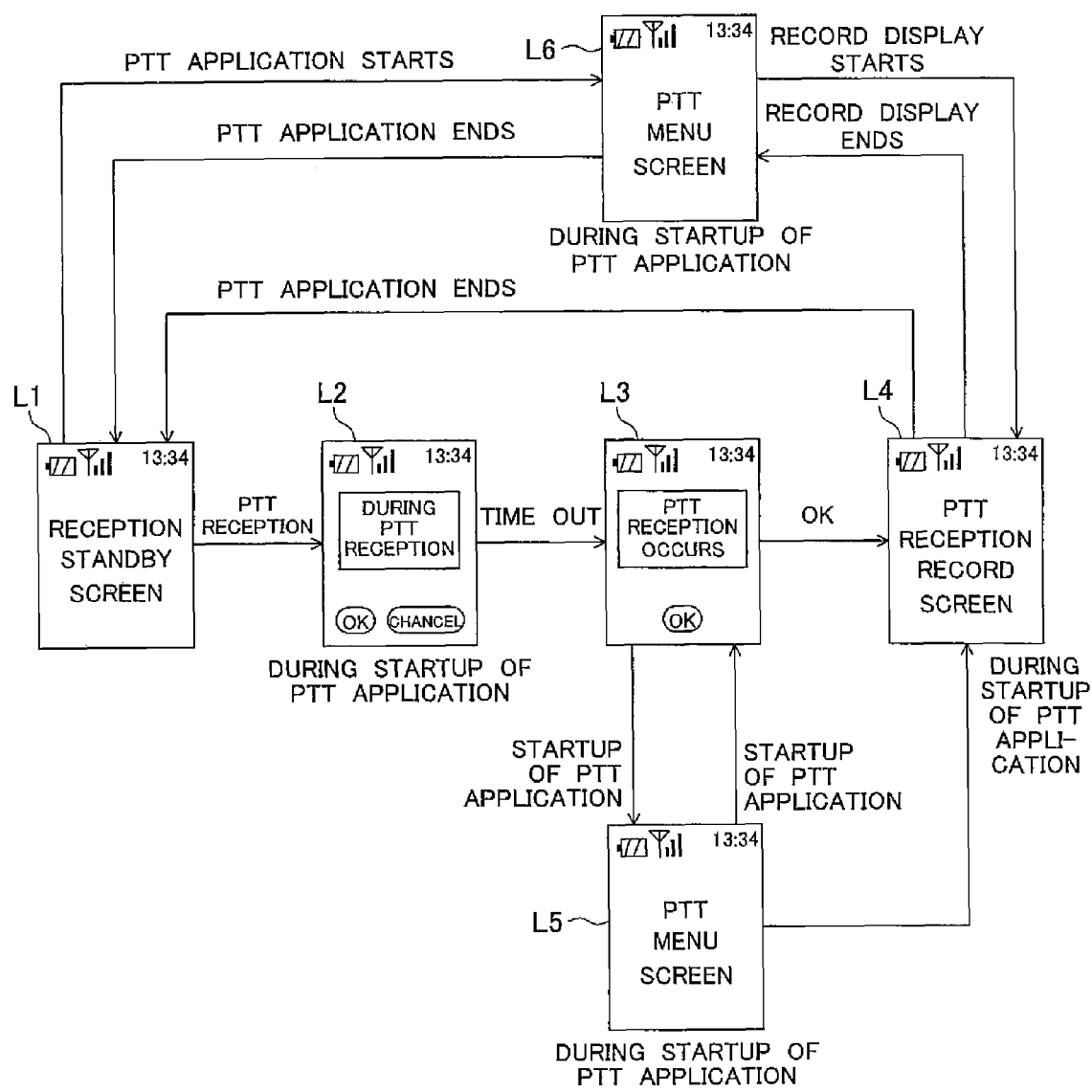
[FIG. 7] A diagram showing an example of a screen transition of a display part according to the second example of operation shown in FIG. 6.

FIG. 7 is a diagram showing an example of the screen transition of the display part 107 according to the second example of the operation explained above.

In FIG. 7, the transition from the screen L1 through the screens L2, L3, and L4 to the screen L1 again is the same as that of FIG. 5.

In the example of FIG. 7, in addition to this screen transition shown in FIG. 5, transition from the screen L3 of the notification of reception of an absent signal to the PTT menu screen L5 is shown. Further, this FIG. 7 shows the transition to the screen L1 from which the notification of reception of an absent signal is erased by shifting from the PTT menu screen 15 to the screen L4 of the absent signal record.

Namely, at the time of standby of the screen L3 displaying the notification of reception of an absent signal, when the PTT application is started up by the operation of the user (for example an operation of selecting the PTT application from the menu screen for selecting the function at the time of standby), the PTT menu screen L5 for selecting various functions of the PTT communication is displayed.

On this PTT menu screen L5, the PTT application is ended without selecting the display of the absent signal record, the original screen L4 is displayed on the display part 107, and the notification of reception of an absent signal does not disappear.

On the other hand, when the display of the absent signal record is selected on the PTT menu screen L5, the screen L4 of the absent signal record is displayed on the display part 107. After the screen L4 of the absent signal record is displayed, when this screen is closed by the operation of the user, the screen shifts to the PTT menu screen L6. When the PTT application is ended on this PTT menu screen L6, the screen returns back to the screen L4 from which the notification of reception of an absent signal is erased.

This is the explanation of the second example of the operation.

Next, a third example of the operation of the communication apparatus according to the present embodiment will be explained.

Figure 8:
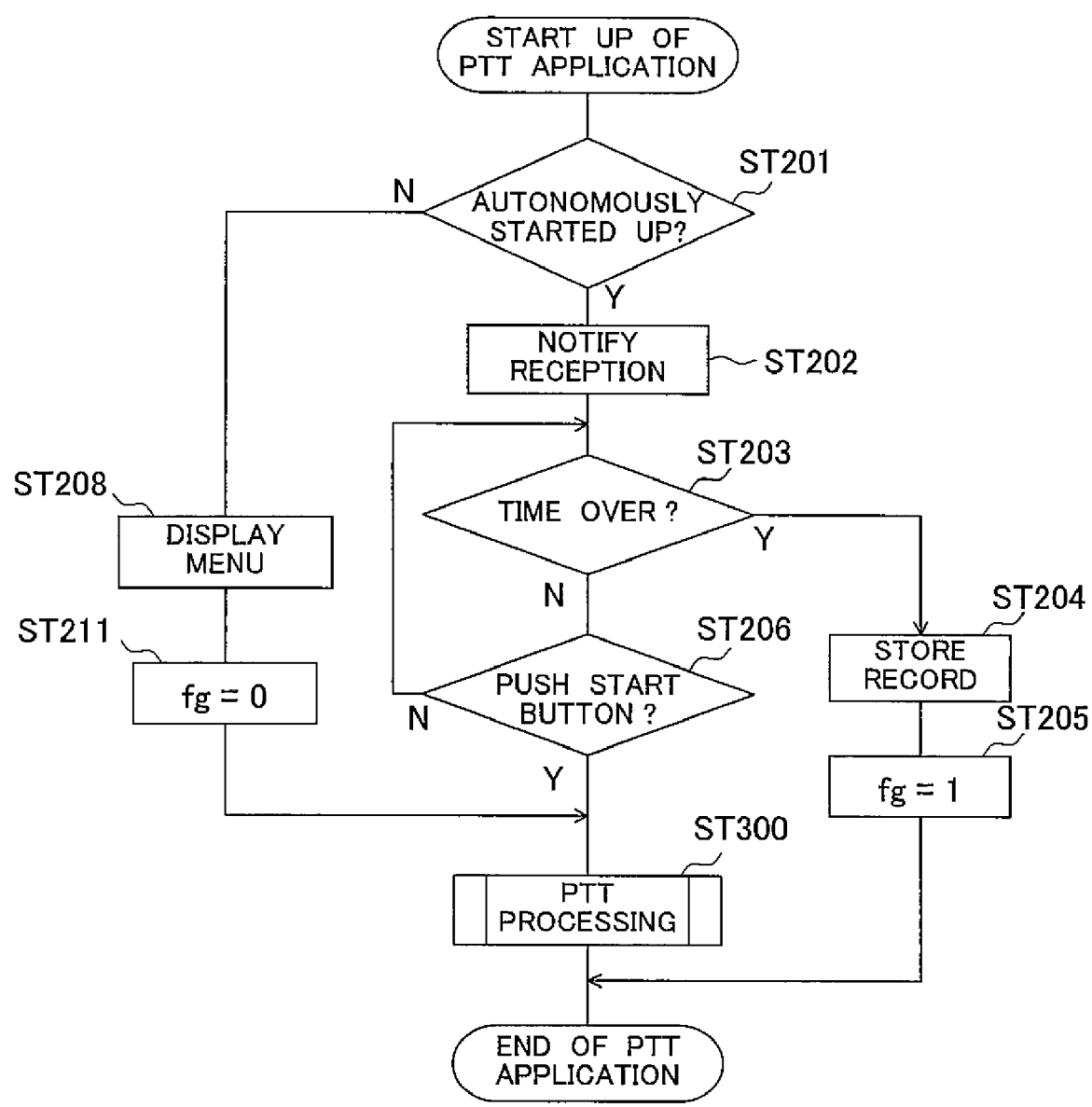
[FIG. 8] A flow chart showing a third example of operation of a communication apparatus at the time of startup of a PTT application.

FIG. 8 is a flow chart showing the third example of the operation of the communication apparatus at the time of the startup of the PTT application. The difference of this from the first example of the operation shown in FIG. 4 resides in the point that the processing in accordance with the second event (steps ST207, ST209, ST210) is omitted, and step ST211 of setting the value of the flag data fg at "0" is added to the flow chart in the case where the PTT application is started up by the operation of the user. The processing in the standby application is the same as that of the flow chart of FIG. 3.

Namely, when the PTT application is started up in accordance with the third event (selection of the PTT application on the menu screen of the standby application), the control part 110 sets the value of the flag data fg at "0" (step ST211).

After that, when the PTT application ends and the standby application returns from the suspended state, since the value of the flag data fg has become "0", the control part 110 suspends the display of the notification of reception of an absent signal (step ST104).

Figure 9:
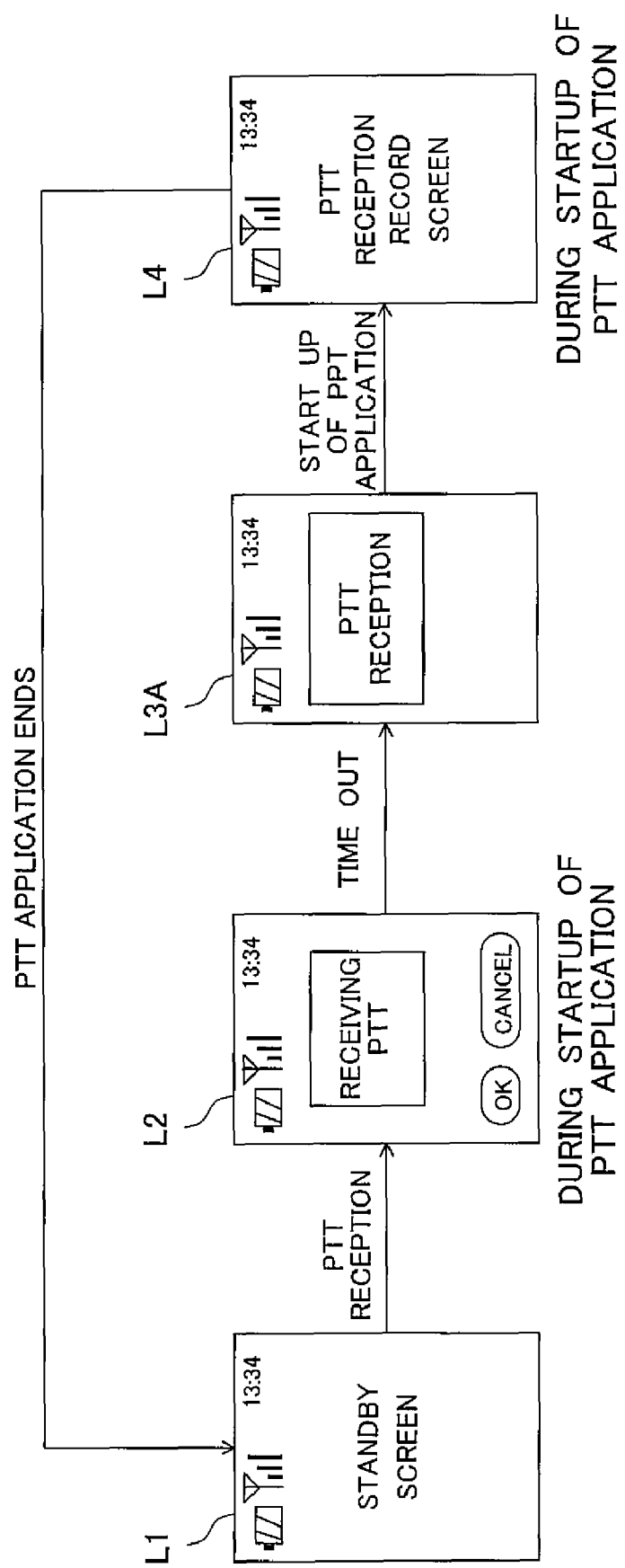
[FIG. 9] A diagram showing an example of a screen transition of a display part according to the third example of operation shown in FIG. 8.

FIG. 9 is a diagram showing an example of the screen transition of the display part 107 according to the third example of the operation explained above.

The transition from the screen L1 at the time of standby to a screen L3A displaying the notification of reception of an absent signal is the same as the transition from the screen L1 to the screen L3 in FIG. 5. The screen L3A displays only the notification of reception of an absent signal "PTT reception occurs", but does not display the "OK button" on the screen L3, therefore the user cannot directly shift from this screen L3A to the screen of the absent signal record of the PTT application. Therefore, in the third example of the operation, the PTT application is started up from the menu screen for selecting the function at the time of standby to shift to the PTT menu screen L4. By the shift to the PTT menu screen L4, it can be judged that at least existence of a no replied to the notification of PTT start was notified to the user. Therefore, even in a case where the user ends the PTT application without opening the screen of the absent signal record from the PTT menu screen L4, the screen returns to the screen L1 from which the notification of reception of an absent signal is erased.

This is the explanation of the third example of the operation.

The communication apparatus according to the present embodiment can control the display of the notification of reception of an absent signal at the time when the PTT application is not yet started up as explained above. In addition, it is also possible to control the notification of reception of an absent signal at the time of the startup of the PTT application.

Namely, in the started up PTT application, the control part 110 controls the display of the notification of reception of an absent signal based on the flag data fg1 to fg3 stored in the external data storage region AR1. For example, when there is a no replied to the PTT start notification, but the absent signal record thereof has not yet been displayed, the notification of reception of an absent signal is displayed in the started up PTT application.

Figure 10:
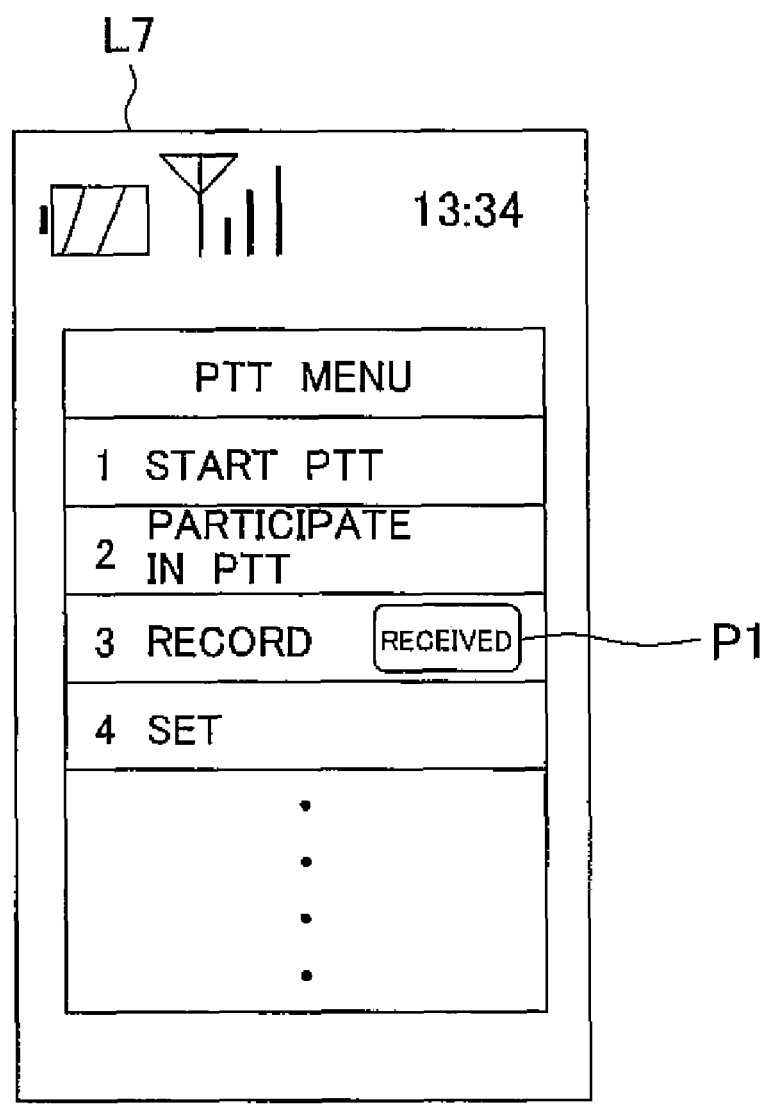
[FIG. 10] A diagram showing an example of a display of notification of reception of an absent signal at the time of startup of a PTT application.

FIG. 10 is a diagram showing an example of the display of the notification of reception of an absent signal at the time of the startup of the PTT application.

In the example of FIG. 10, on the PTT menu screen L7, selective functions in the PTT application are displayed in a table.

For example, in FIG. 10, when "1. Start PTT" is selected the screen shifts to the menu screen for starting the PTT communication. When "2. Participate in PTT" is selected, the screen shifts to the menu screen for participating in the PTT communication during opening. When "3. Record" is selected, the screen shifts to the screen for the display of the absent signal record or other record. When "4. Set" is selected, the screen shifts to the screen for performing various settings concerning the PTT communication.

Here, in the field of "3. Record", a mark of "Reception" is displayed when no replied to the PTT start notification is received. Accordingly, the user can grasp the existence of the absent signal by just confirming this mark on the PTT menu screen even when he does not take the trouble to select the screen of the absent signal record.

As explained above, by the communication apparatus according to the present embodiment, when the PTT start notification is received at the communication part 102, the PTT application for executing the processing concerning PTT communication is started up. In this started up PTT application, when the instruction for starting the PTT communication is not input to the key input part 103 for a predetermined time, the PTT application autonomously ends, and the flag data fg having the value "1" is stored in the external data storage region AR1. Then, when the PTT application is not yet started up, based on the flag data fg stored in the external data storage region AR1, a notification of reception of an absent signal showing no reply to the PTT start notification is displayed on the display part 107.

Accordingly, even after the PTT application for executing the processing concerning the PTT communication ends, the fact of no reply to the start notification of the PTT communication can be notified to the user.

Further, by the communication apparatus according to the present embodiment, when the PTT application is started up in response to a first startup instruction input to the key input part 103, if the display part 107 is in the middle of display of the notification of reception of an absent signal, the display of the notification of reception of an absent signal is suspended after the end of the PTT application.

For example, when the PTT application is started up in response to the first startup instruction, the value of the flag data fg which is stored in the external data storage region AR1 is set at "0". After the end of the PTT communication, the display of the notification of reception of an absent signal on the display part 107 is suspended in accordance with the flag data fg having this value "0".

In this way, conditional on the startup of the PTT application according to the instruction of the user, the display of the notification of reception of an absent signal is suspended after the end of that PTT application. Therefore, a situation where the display of the notification of reception of an absent signal is suspended at a stage where the user does not grasp the existence of the absent signal can be effectively prevented.

Further, by the communication apparatus according to the present embodiment, when the flag data fg having the value "1" indicating no reply to the PTT start notification is stored in the external data storage region AR1, the information of the sender of this PTT start notification is stored in the application region AR2 as the absent signal record. Then, when the PTT application is started up in response to the first startup instruction input to the key input part 103, in the started up PTT application, this absent signal record is automatically read out from the application region AR2 and displayed on the display part 107.

Due to this, when the display of the notification of reception of an absent signal is suspended, more detailed information concerning the no reply to the PTT start notification (absent signal record) is displayed to the user, therefore a situation where the display of the notification of reception of an absent signal is suspended at a stage where the information concerning the absent signal is not transferred to the user can be more reliably prevented.

Further, by the communication apparatus according to the present embodiment, when a predetermined instruction is further input from the key input part 103 after the startup of the PTT application in response to a second startup instruction input to the key input part 103, the absent signal record is displayed on the display part 107 and, at the same time, the value of the flag data fg of the external data storage region AR1 is set at "0". Then, after the end of the PTT application, the display of the notification of reception of an absent signal on the display part 107 is suspended in accordance with the flag data fg having this value "0". Namely, in the case where the display of the absent signal record is selected according to the instruction of the user input to the key input part 103 as well, the display of the notification of reception of an absent signal is suspended.

Accordingly, the display of the absent signal record can be suitably suspended at the stage where the information concerning the absent signal is reliably transferred to the user.

Further, by the communication apparatus according to the present embodiment, in the started up PTT application, the information indicating no reply to the PTT start notification is displayed on the display part 107 based on the flag data fg stored in the external data storage region AR1. Due to this, not only at the time when the PTT application is not started up, but also the time when the PTT application is started up, the existence of a PTT start notification which was not replied to can be reliably informed to the user.

In the example of FIG. 9, as a method of shifting from the screen L3A displaying the notification of reception of an absent signal to the PTT menu screen L4, a method of selecting the startup of the PTT application by the function selection use menu at the time of standby is mentioned, but the present invention is not limited to this. For example, an "OK button" the same as on the screen L3 may be displayed on the screen L3A, and the screen may directly shift to the PTT menu screen L4 when this "OK button" is pushed. By this method as well, it can be confirmed that the user grasps the existence of the absent signal by the depression of the "OK button", therefore the display of the absent signal record can be suitably suspended after the end of the PTT application.

In the embodiment explained above, PTT is mentioned as an example of data communications, but the present invention is not limited to this. It can be applied to a variety of data communications.

Next, an example of leaving a record of reply particularly when an automatic reply function is used for reply when displaying a communication record as previously shown will be explained. Note that, basically, the configuration itself does not differ from that previously explained, but control functions of the control part are somewhat added, so an explanation will be given of the same.

The operation of the control part 110 when replying by using the automatic reply function and leaving a record thereof will be explained. The control part 110 automatically starts up the PTT application when receiving the start notification of the PTT communication at the communication part 102 and performs the following processing in accordance with an operation mode set in advance (manual reply mode or automatic reply mode).

<Manual Reply Mode>

Where the manual reply mode is set, the control part 110 shown in FIG. 2 waits for the input of an instruction of the start of PTT communication from the key input part 103 in the started up PTT application. When this instruction is input, the control part 110 executes the start processing of the PTT communication by the communication part 102. Namely, it transmits a reply indicating participation in the PTT communication from the communication part 102 to the communication management apparatus 200 and, at the same time, accesses the site provided by the communication management apparatus 200 based on the information included in the start notification and starts the PTT communication.

On the other hand, when this start instruction is not input within a predetermined time, the control part 110 ends the started up PTT application and, at the same time, stores the flag data (fg="1") indicating no reply to the start notification of the PTT communication (that is the absent signal of PTT occurred) in the external data storage region AR1 of the storage part 108.

When storing the flag data (fg="1") indicating no reply to the PTT start notification in the external data storage region AR1, the control part 110 stores the information concerning this PTT communication as an "absent signal record" in the application region AR2. The absent signal record includes for example information of the host terminal and participant terminals (names, phone numbers, etc.) and information of the transmission date of the start notification.

<Automatic Reply Mode>

Where the automatic reply mode is set, the control part 110 shown in FIG. 2 executes the start processing of the PTT communication by the communication part 102 irrespective of presence/absence of an instruction input from the key input part 103. Namely, it transmits a reply indicating participation in the PTT communication from the communication part 102 to the communication management apparatus 200 and, at the same time, accesses the site provided by the communication management apparatus 200 based on the information included in the start notification and starts the PTT communication.

When starting the PTT communication in the automatic reply mode, the control part 110 stores the information transmitted and received at the communication part 102 as a communication log in the application region AR2 of the storage part 108. The information stored as the communication log is mainly communication information with the communication management apparatus 200 and communication information with the other communication apparatuses performing PTT communication via the communication management apparatus 200 and includes for example the sender name of PTT communication, text data thereof, and other transmission data.

Further, in this case, the control part 110 stores the information concerning an instruction input to the key input part 103 concerning the PTT communication during execution as a key operation log in the application region AR2 of the storage part 108. This key operation log includes for example information indicating which key of the key input part 103 was operated during the PTT communication.

When a predetermined condition is established during the PTT communication automatically started in the automatic reply mode, the control part 110 automatically ends the PTT communication. For example, it automatically ends the PTT communication in the case where an end notification of the PTT communication sent from the communication management apparatus 200 is received at the communication part 102 or the case where the transmission/reception of the information concerning the PTT communication is not carried out in the communication part 102 for a predetermined time or longer.

When automatically started PTT communication automatically ends, the control part 110 judges whether or not information transmission from the same communication apparatus concerning the PTT communication occurred based on the communication log stored in the application region AR2.

For example, the control part 110 searches for the user name of the same communication apparatus stored in the storage part 108, for example, the sender name matching a nickname etc. of the user of the same communication apparatus notified to the other communication apparatuses from the communication log, and judges that information transmission from the same communication apparatus did not occur when a matching one is not included.

Figure 13:
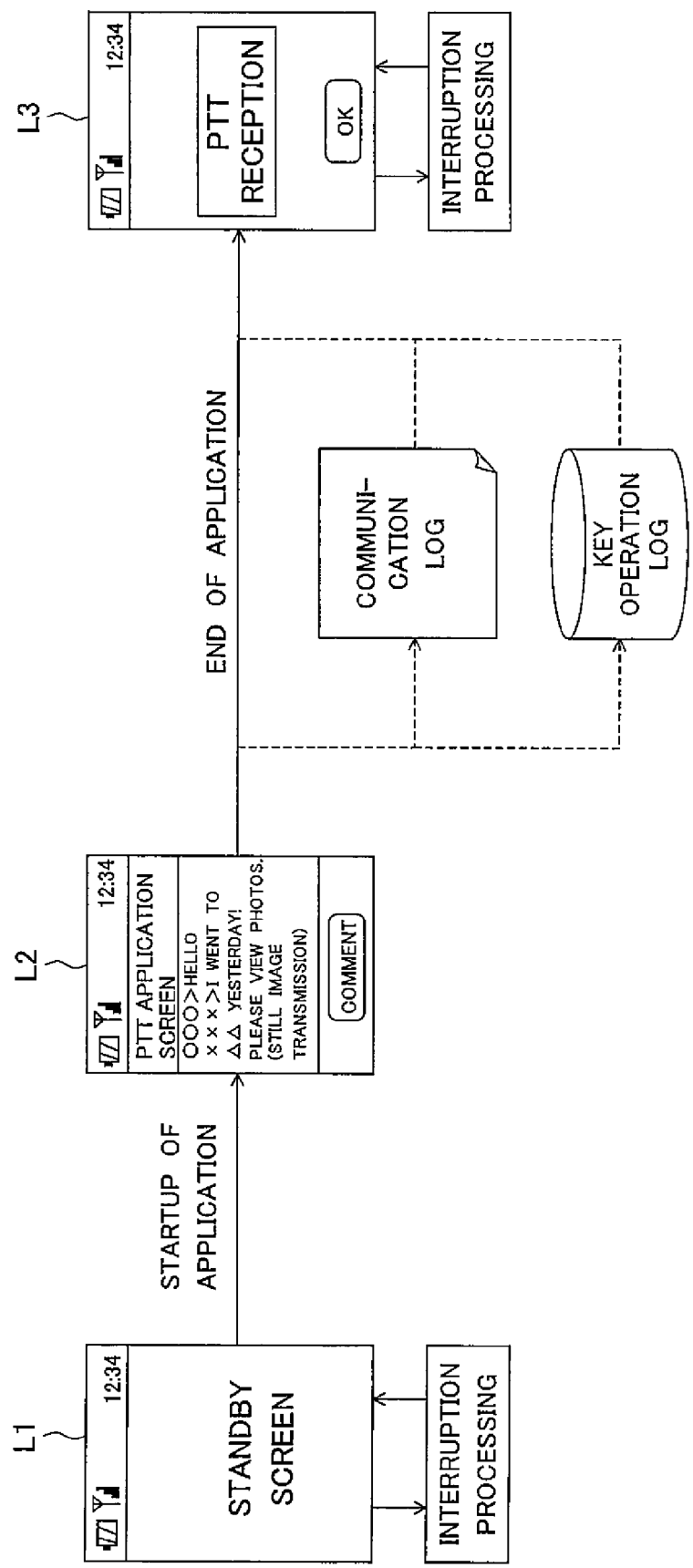
[FIG. 13] A diagram showing an example of a screen transition of the display part in an automatic reply mode.

When explaining a chat by text as an example, in the communication log in this case, for example as shown in the screen L2 of FIG. 13, data is recorded in a sequence of "sender name", ">(punctuation mark)", "speaking content", and "line change code". The control part 110 extracts a character string sandwiched by ">(punctuation mark)" and "line change code" as the sender name in the communication log with the form as described above and judges whether or not this and the user name of the same communication apparatus match.

When the data length of the sender name is longer than a predetermined value, for example only a head portion of the sender name is recorded in the communication log. In a case where the data length of the "sender name" in the communication log is restricted to a predetermined value or less in this way and the data length of the user name of the same communication apparatus is longer than this predetermined value, the control part 110 judges if a sender name matching the forward part of the user name of the same communication apparatus is included in the communication log. For example, when the number of characters of the "sender name" is restricted to eight or less in the communication log and the number of characters of the user name of the same communication apparatus is 10, the control part 110 judges if a "sender name" matching with the character string of the head eight characters worth of the user name of the same communication apparatus is included in the communication log.

Further, when the automatically started PTT communication ends, the control part 110 judges whether or not an instruction was input to the key input part 103 concerning the PTT communication based on the key operation log stored in the application region AR2. For example, in a case where an operation of scrolling the screen of the display part 107 for reading a submitted content of the sender of the PTT communication, an operation of enlarging the display of the submitted image in the PTT communication on the display part 107, or other operation is recorded in the key operation log, the control part 110 judges that an instruction concerning the PTT communication was input.

As a result of performing the above judgment, when there was neither information transmission from the same communication apparatus nor input of an instruction to the key input part 103, the control part 110 stores the flag data (fg="1") indicating no reply to the start notification of the PTT communication (that is, the occurrence of the absent signal of PTT) in the external data storage region AR1 of the storage part 108.

Note that, when automatically executing the PTT communication in the automatic reply mode, there is a possibility of reception of the start notification of other PTT communication at the communication part 102. In such case, the control part 110 may continue the previous PTT communication without replying to the latter PTT communication or may interrupt the previous PTT communication and automatically start the latter PTT communication.

When the latter PTT communication is automatically started, the control part 110 performs the judgment explained above for the PTT communication at the time of the end of the latter PTT communication and, at the same time, performs the same judgment for the interrupted previous PTT communication as well. Then, when judging no information transmission from the communication apparatus and no instruction input to the key input part 103 in any of the two PTT communications, the control part 110 stores the flag data (fg="1") indicating the occurrence of the absent signal of PTT in the external data storage region AR1 of the storage part 108.

The case where three or more PTT communications are executed in the automatic reply mode while overlapping is the same as described above. When judging no information transmission from the communication apparatus and no instruction input to the key input part 103 in any PTT communication among those, the control part 110 stores the flag data (fg="1") indicating the occurrence of the absent signal of PTT in the external data storage region AR1 of the storage part 108.

When storing the flag data (fg="1") indicating no reply to the PTT start notification in the external data storage region AR1, in the same way as the case of the manual reply mode, the control part 110 stores the absent signal record concerning the sender of this in the application region AR2.

After performing the above judgment, storage of flag data, and storage of an absent signal record, the control part 110 ends the PTT application and executes another application program, for example, an application program for the display of the standby screen (hereinafter sometimes called a "standby application").

This is the explanation of the processing of the control part 110 in the manual reply mode and automatic reply mode.

When the PTT application is not yet started up, for example, when the standby application is executed, the control part 110 displays information indicating no reply to the PTT start notification (hereinafter called "notification of reception of an absent signal") on the display part 107 based on the flag data fg stored in the external data storage region AR1. For example, when the flag data fg having the value "1" is stored in the external data storage region AR1, the control part 110 displays "PTT reception occurs" or another message on the standby screen.

When an operation for confirming the absent signal record is carried out with respect to the key input part 103 in response to this notification of reception of an absent signal, the control part 110 suspends the display of the notification of reception of an absent signal on the display part 107. The method for confirming the absent signal record includes for example the following two methods.

In a first method, a predetermined instruction (first startup instruction) is input from the key input part 103 to start up the PTT application. The display processing of the absent signal record is automatically executed in that started up PTT application.

Namely, when starting up the PTT application in response to the first startup instruction, the control part 110 automatically reads out the absent signal record from the application region AR2 in this started up PTT application and displays the same on the display part 107.

For example, when displaying "PTT reception occurs" or another notification of reception of an absent signal on the screen of the display part 107, the control part 110 displays a button representing a specific key of the key input part 103 on the same screen as this. For example, it displays the "OK" button on the screen L3 of FIG. 13. When this screen is displayed, when the specific key described above is pushed by the user, the control part 110 starts up the PTT application and automatically displays the screen of the absent signal record in the started up PTT application.

On the other hand, in a second method, after the PTT application is started up by inputting a predetermined startup instruction (second startup instruction) from the key input part 103, the display processing of the absent signal record is executed by further inputting a predetermined instruction from the key input part 103 in that started up PTT application.

Namely, when a predetermined instruction is further input to the key input part 103 after the PTT application is started up in response to the second startup instruction input to the key input part 103, the control part 110 reads out the absent signal record from the application region AR2 and displays this on the display part 107.

For example, when the predetermined key (menu key) of the key input part 103 is pushed when the standby screen is displayed, the control part 110 displays the menu screen for selecting various functions on the display part 107. When the key input part 103 is operated so as to select the PTT application from this menu screen, the control part 110 judges this as the second startup instruction explained above and starts up the PTT application. When receiving this second startup instruction and starting up the PTT application, the control part 110 displays the menu screen for selection of further detailed functions concerning the PTT communication on the display part 107. When the key input part 103 is operated so as to display the absent signal record from this menu screen, the control part 110 reads out the absent signal record from the application region AR2 and displays this on the display part 107.

When starting up the PTT application by the method as described above and displaying the absent signal record, the control part 110 changes the value of the flag data fg stored in the application region AR2 from "1" to "0". In the case where the value of the flag data fg has not become "1" when the PTT application ends and the standby application is returned, the control part 110 judges no existence of an absent signal of PTT and suspends the display of the notification of reception of an absent signal on the display part 107.

The control part 110 explained above has, as blocks concerning the PTT communication, for example, a group communication control part 111 and report control part 112.

The group communication control part 111 shown in FIG. 2 is a block for performing the processing concerning group communication and performs for example processing concerning the start and end of the PTT communication in the automatic reply mode explained above. Namely, when the start notification of PTT communication is received at the communication part 102 in the automatic reply mode, the PTT communication is automatically started by the communication part 102.

The report control part 112 performs the processing concerning the report of the absent signal of PTT. Namely, when the group communication control part 111 automatically starts the PTT communication in the automatic reply mode, the information (communication log) concerning the sender of the data transmitted/received during the PTT communication and the information (key operation log) concerning the instruction input from the key input part 103 during the PTT communication are stored in the storage part 108. Then, in a case where the information indicating participation in the group communications is not stored in the storage part 108 at the time when this group communication ends, the notification of reception of an absent signal is displayed on the display part 107.

Here, the operation of the communication apparatus having the configuration explained above will be explained with reference to the flow charts of FIG. 11 and FIG. 12.

Figure 11:
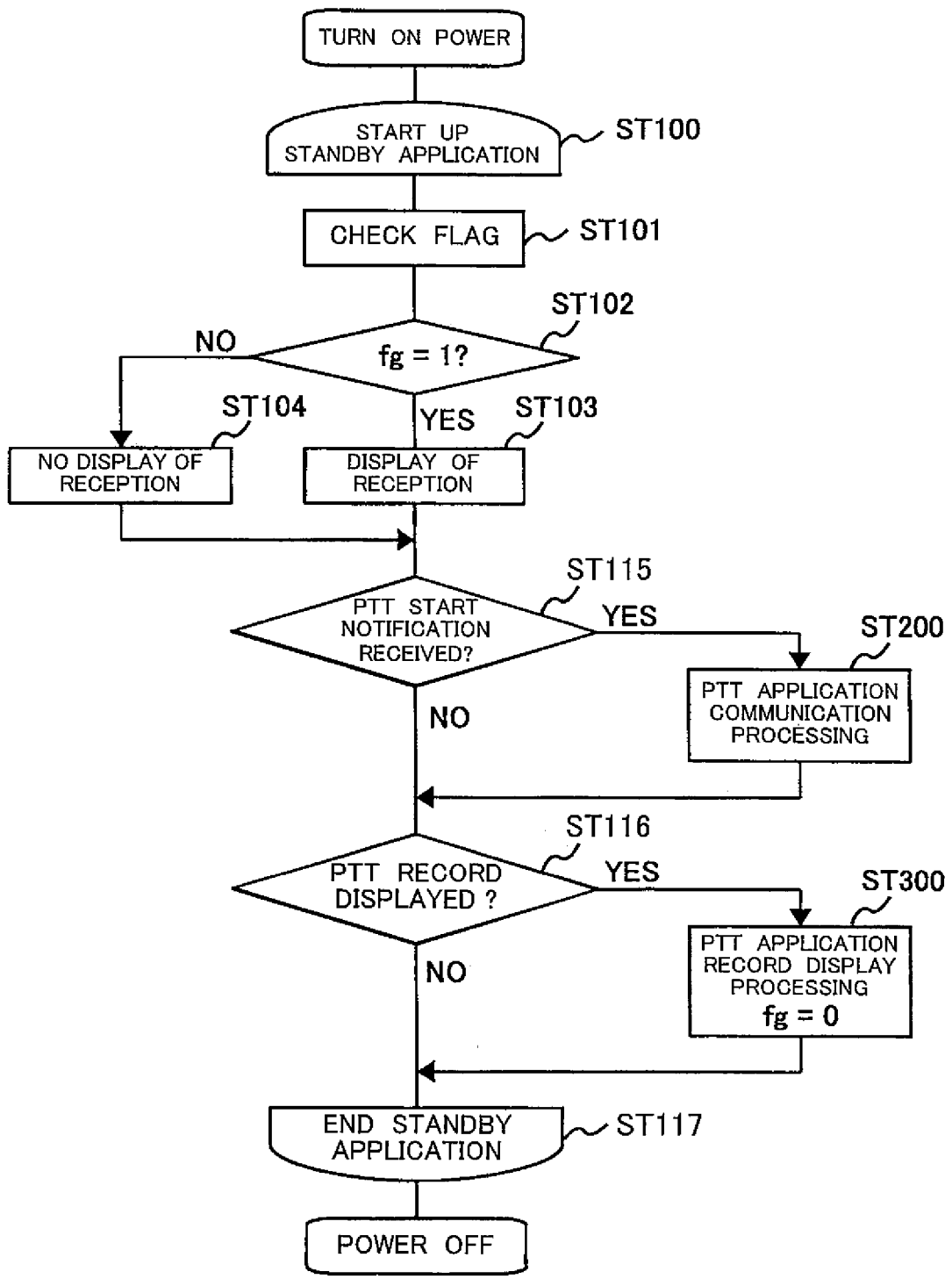
[FIG. 11] A flow chart showing an example of an operation for starting up a PTT application from a standby state.

FIG. 11 is a flow chart showing an example of the operation of starting up the PTT application from the standby state.

When the communication apparatus is powered up, the control part 110 starts up the standby application (step ST100).

The control part 110 checks the value of the flag data fg stored in the external data storage region AR1 in the started up standby application (step ST101). When the value of the flag data fg is "1", the control part 110 judges that a no reply to the PTT start notification was received and displays the notification of reception of an absent signal on the screen of the display part 107 (step ST103). On the other hand, when the value of the flag data fg is "0", it erases the notification of reception of an absent signal from the screen of the display part 107 (step ST104).

When the start notification of PTT communication is received at the communication part 102 during the execution of the standby application (step ST115), the control part 110 sets the standby application at the suspended state and starts up the PTT application (step ST200).

Further, when the operation for displaying the reception record of PTT is carried out with respect to the key input part 103 during the execution of the standby application (step ST116), the control part 110 starts up the PTT application and displays the reception record of PTT on the screen of the display part 107 (step ST300). When the absent signal record is displayed on this screen, the control part 110 sets the value of the flag data fg stored in the external data storage region AR1 at "0".

When the display of the reception record of PTT ends, the control part 110 ends the PTT application and starts up the standby application set in the suspended state again.

Figure 12:
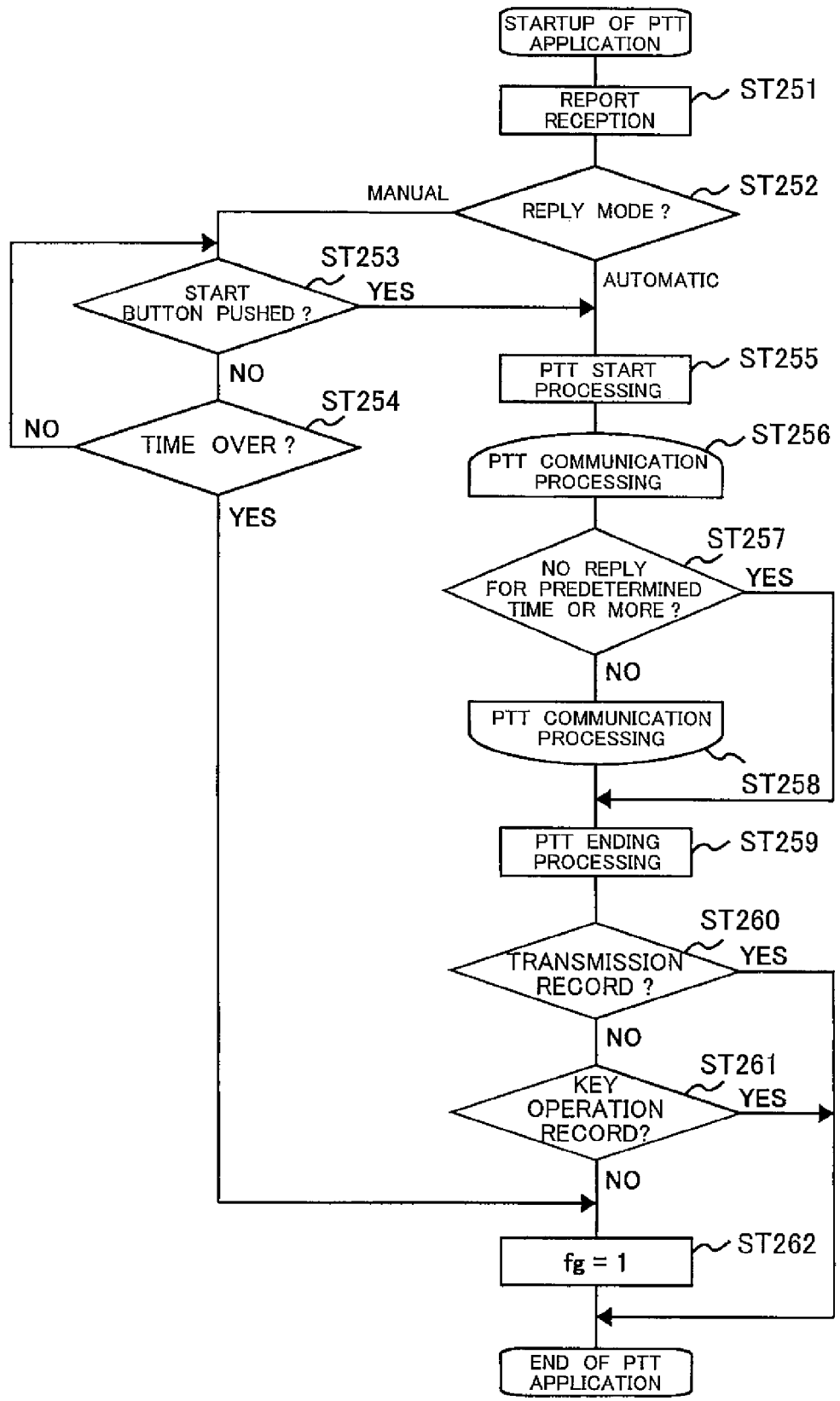
[FIG. 12] A flow chart showing an example of the operation of the communication apparatus when the PTT application is automatically started up in accordance with reception of a start notification of PTT communication.

FIG. 12 is a flow chart showing an example of the operation of the communication apparatus when the PTT application is automatically started up in accordance with the reception of the start notification of the PTT application.

When the start notification of PTT application is received at the communication part 102, the control part 110 automatically starts up the PTT application and executes the operation for reporting the PTT reception (step ST251). For example, it informs the reception of the start notification of PTT communication by for example displaying a message informing the reception of PTT on the screen of the display part 107 or generating a sound at the speaker 105.

Then, the control part 110 judges whether the operation mode is the automatic reply mode or manual reply mode (step ST252).

In the case of the manual reply mode, the control part 110 monitors whether or not a predetermined key (start button of PTT communication) provided in the key input part 103 is pushed (step ST253). When the start button is not pushed within a predetermined time, the control part 110 judges that no participation instruction with respect to the PTT communication is input (step ST254), sets the flag data fg of the external data storage region AR1 at "1" (step ST262), and ends the PTT application.

On the other hand, in the case of the automatic reply mode, the control part 110 executes the start processing of the PTT communication irrespective of the presence/absence of an operation with respect to the key input part 103 (step ST255). Namely, it transmits a reply indicating participation in PTT communication to the communication management apparatus 200 and, at the same time, logs in the site for the PTT communication management based on the information included in the received start notification of PTT communication and starts the PTT communication.

During the execution of the PTT communication processing (step ST256), the control part 110 monitors the transmission/reception of information concerning the PTT communication and the operation to the key input part 103 and stores a log thereof (communication log and key operation log) in the storage part 108.

Further, the control part 110 monitors whether an operation with respect to the key input part 103 or the transmission/reception of the information in the communication part 102 is carried out within a predetermined time (step ST257). When judging that the key operation or transmission/reception of information is not carried out for a predetermined time or longer, it executes the end processing of PTT communication (step ST259). The control part 110 ends the PTT communication processing in the case where the end notification of PTT communication is received from the communication management apparatus 200 and the case where the end instruction of PTT communication is input at the key input part 103.

When ending the communication processing, the control part 110 judges whether the information indicating that the information was transmitted from the same apparatus is included in the communication log of the storage part 108 (step ST260). When the information of the information transmission from the same communication apparatus is not included, the control part 110 judges if the information indicating that a key operation concerning the PTT communication was carried out is included in the key operation log (step ST261). When the information of a key operation concerning the PTT communication is not included either, the control part 110 sets the flag data fg of the external data storage region AR1 at "1" (step ST262) and ends the PTT application.

In the case where the information of the information transmission from the same communication apparatus is included in the communication log or the case where the information of a key operation concerning the PTT communication is included in the key operation log, the control part 110 ends the PTT application without changing the value of the flag data fg.

FIG. 13 is a diagram showing an example of the screen transition of the display part 107 in the automatic reply mode.

When the communication part 102 receives a PTT start notification at the time of standby (screen L1), the PTT application is automatically started up to start the PTT communication. In the PTT communication, for example as shown in the screen L2, the sender name and the submitted content thereof are displayed on the screen of the display part 107.

When the PTT communication ends, it is judged at the control part 110 if information indicating participation in the PTT communication is included in the communication log or key operation log of the storage part 108. When information indicating participation is not included as the result of this judgment, the notification of reception of an absent signal ("PTT communication occurs") is displayed on the standby screen L3 after the end of the PTT application.

The notification of reception of an absent signal is not erased even when interruption processing according to another application program which is not the PTT application occurs and is continuously displayed on the standby screen.

On the other hand, when a predetermined key of the key input part 103 corresponding to the display of "OK" on the screen L3 is pushed, the PTT application is started up and the absent signal record is displayed. After this display, when the standby screen is returned to again, the notification of reception of an absent signal ("PTT communication occurs") is erased from the screen of the display part 107.

As explained above, according to the present embodiment, when PTT communication which automatically started in response to a start notification ends, it can be suitably informed to the user that a no reply to the PTT communication start notification was received (there is an absent signal of PTT) based on presence/absence of information transmission from the communication part 102 in the same apparatus or the input of an instruction at the key input part 103.

Namely, in the case where a record indicating information transmission from the same communication apparatus is not included in the communication log or the case where a record indicating input of an instruction at the key input part 103 is not included in the key operation log, the user did not participate in the PTT communication at all. However, it can be judged that the user did not know of the start of the PTT communication. Therefore, by informing the presence of the absent signal of PTT (for example a display on the display part 107) in such a case, a situation where the user is not aware of the existence of the absent signal of PTT at all can be effectively avoided. Further, in the case where a record indicating the transmission of information from the same apparatus is included in the communication log or the case where a record indicating the input of the instruction at the key input part 103 is included in the key operation log, it can be judged that the user participated in the PTT communication and the user knows that the PTT communication was started. By preventing the report of the absent signal in such a case, useless reports need not be made.

An embodiment of the present invention was explained up to here, but the present invention is not limited to only the form described above. Various modifications are possible.

In the above embodiment, the example of displaying "PTT reception occurs" or another message on the screen of the display part 107 in the case where an absent signal was to be reported was explained, but the present invention is not limited to this. For example, the absent signal may be reported as well by a sound generated at the speaker 105, vibration generated by a not shown vibration part, or light generated by a not shown light emitting part.

In the flow chart shown in FIG. 12, the judgment processing (steps ST260 and ST261) based on the communication log and key operation log was carried out after ending the PTT communication processing (step ST256), but the present invention is not limited to this. For example, when the PTT communication ends by the operation of the user in the key input part 103, it can be clearly judged that the user knew of the PTT communication, therefore the control part 110 may end the PTT application without performing the judgment processing (steps ST260 and ST261).

The communication log and key operation log may be recorded only at the time of the automatic reply mode or may be recorded in another operation mode.

An embodiment of the present invention was explained hitherto, but the present invention is not limited to only the above embodiment and includes many variations.

In the above embodiment, the example of using an LCD or other planar display for the display part 107 was mentioned, but the present invention is not limited to this. The display of the notification of reception of an absent signal may be carried out by turning on or off of for example an LED or other light emitting element.

All of the functions of the components of the communication apparatus explained above may be realized by software or at least a portion thereof may be realized by hardware. For example, the processing in the control part 110 and data processing in the communication part 102 and audio processing part 104 may be realized on a computer according to one or more programs or at least a portion thereof may be realized by hardware.

Note that, in the present invention, both of the display function of the record information explained in FIGS. 3 to 10 and the display function of the record information in the automatic reply shown in FIG. 11 to FIG. 13 may be provided or only one may be provided.

Industrial Applicability

In the above embodiments, PTT was mentioned as an example of group communication, but the present invention is not limited to this and can be applied to other various group communications as well.

The invention claimed is:

1. A communication apparatus comprising;
a communication part, which is a transmitting/receiving section for performing data communication,
a display part displaying information,
an input part inputting an instruction,
a storage part, and
a control part able to execute
a control for starting up a first program for executing processing relating to the data communication when the communication part receives a start notification of data communications by monitoring the communication part,
a control for ending the first program and storing first data of no reply to the start notification in the storage part based on a lack of generation of any input from the input part for a predetermined time in a state where the first program is started up, and
a control for displaying first information indicating no reply to the start notification on the display part according to a presence of the first data stored in the storage part in a state where the first program is not started up.

2. A communication apparatus as set forth in claim 1, wherein;
the control part performs a control so that the first information is not displayed on the display part when the first program is ended after starting up the first program in response to a first startup instruction input from the input part during displaying the first information on the display part.

3. A communication apparatus as set forth in claim 2, wherein
the control part stores second data in the storage part when starting up the first program in response to the first startup instruction, and prohibits the display of the first information in a state where the second data is stored in the storage part, and the first program is not started up.

4. A communication apparatus as set forth in claim 2, wherein;
the control part makes the storage part store information of a sender of the start notification when storing the first data in the storage part, and displays the information of the sender stored in the storage part on the display part when starting up the first program in response to the first startup instruction.

5. A communication apparatus as set forth in claim 1, wherein;
the control part makes the storage part store the information of the sender of the start notification linked with the first data when storing the first data in the storage part, displays the information of the sender stored in the storage part on the display part and stores third data in the storage part when a predetermined instruction input is further inputted from the input part after starting up the first program in response to a second startup instruction input from the input part, and prohibits the display of the first information in a state where the third data is stored in the storage part and the first program is not started up.

6. A communication apparatus as set forth in claim 1, wherein;
the control part can display information indicating no reply to the start notification on the display part based on the first data stored in the storage part even in the state where the first program is started up.

7. A communication apparatus comprising;
a communication part performing data communication,
a display part displaying information, an input part inputting an instruction, a storage part storing first data of no reply to the start notification based on a lack of generation of any input from the input part for a predetermined time, and a control part, in a case of starting up a first program for executing processing concerning data communication by input from the input part during the display on the display part of the first data indicating no reply to a start notification of data communication received at the communication part, performing control so as to prohibit the display of the first information after the end of the first program.

8. A communication apparatus as set forth in claim 7, wherein;

the control part can display information indicating no reply to the start notification on the display part based on the first data indicating no reply to the start notification stored in the storage part in the state where the first program is executed.

9. An information display method of a communication apparatus provided with a communication part performing data communication, a display part displaying information, an input part inputting an instruction, and a storage part, comprising the steps of;

starting up a first program for executing processing concerning the data communication when the communication part receives a start notification of the data communication, ending the first program and storing first data of no reply to the start notification in the storage part based on a lack of generation of any input from the input part for a predetermined time in the state where the first program is executed, and displaying first information indicating no reply to the start notification on the display part according to a presence of the first data stored in the storage part in the state where the first program is not executed.

10. A communication apparatus provided with a communication part performing group communication, an input part inputting an instruction, a report part, a storage part and a control part starting group communication by the communication part via a predetermined server apparatus based on a start notification when receiving a start notification of group communication at the communication part, wherein;

the control part makes the report part report when group communication ends and when no information transmission from the communication apparatus itself by the communication part and/or input of an instruction in the input part during the started group communication, and the control part controls the storage part to store data of no reply to the start notification based on a lack of generation of any input from the input part.

11. A communication apparatus as set forth in claim 10, wherein;

the control part makes the report part report that there was no input of a reply instruction with respect to the start notification in the input part, although the start notification was received.

12. A communication apparatus as set forth in claim 10, wherein;

the control part can automatically perform start processing of group communication by the communication part even without input of an instruction in the input part if receiving the start notification at the communication part.

13. A communication apparatus as set forth in claim 10, wherein;

the communication apparatus is provided with a storage part, and the control part makes the storage part store communication information transmitted and received at the communication part during the group communication and, when the group communication ends, judges presence/absence of the information transmission from the same apparatus based on the communication information stored in the storage part.

14. A communication apparatus as set forth in claim 10, wherein;

the control part judges that there was no information transmission from the communication apparatus itself when the communication information stored in the storage part does not include information transmitted from the communication apparatus itself.

15. A communication apparatus as set forth in claim 14, wherein;

the communication information includes a sender name indicating the sender of the information during group communication, the storage part stores the user name of the same communication apparatus, and the control part judges that there was no information transmission from the communication apparatus itself when the user name is not included in the sender name in the communication information.

16. A communication apparatus as set forth in claim 15, wherein;

data representing the sender name in the communication information is restricted in data length to a predetermined value or less, and the control part judges whether or not the user name is included in the communication information according to whether or not a sender name matching with the related user name at the forward part is included in the communication information if the data length of the user name stored in the storage part is longer than the predetermined value.

17. A communication apparatus as set forth in claim 10, wherein;

the apparatus is provided with a storage part, and the control part makes the storage part store information concerning an instruction input in the input part concerning group communication in progress and, when the related group communication ends, judges whether or not an instruction is input in the input part concerning the group communication based on the information stored in the storage part.

18. A communication apparatus as set forth in claim 17, wherein;

the control part judges that an instruction is input in the input part concerning the group communication when the information stored in the storage part includes a reply instruction with respect to the start notification of group communication or information concerning an instruction input during group communication.

19. A communication apparatus as set forth in claim 10, wherein;

the control part automatically ends the group communication when predetermined conditions are established during group communication, and makes the report part report when the ended group communication was automatically started and there was no information transmission from the communication part in the communication apparatus itself or no input of an instruction in the input part concerning the group communication.

20. A communication apparatus as set forth in claim 19, wherein;
the predetermined conditions are at least one of a case where an end notification of group communication is received in the communication part or a case where any transmission/reception of information concerning group communication is not carried out for a predetermined time or longer in the communication part.

21. A communication apparatus as set forth in claim 10, wherein;
the control part performs makes the report part report in a case where a plurality of group communications which were automatically started in response to the start notification end and there was no information transmission from the communication part in the communication apparatus itself or no input of an instruction in the input part concerning at least one of the plurality of group communications.

22. A communication apparatus comprising;
a communication part performing group communication,
an input part inputting an instruction,
a storage part storing information,
a report part,
a group communication control part automatically starting group communication by the communication part when a start notification of group communication is received at the communication part, and
a report control part for making the storage part store information concerning the sender of data transmitted and received during the group communication and/or information concerning an instruction input from the input part during the group communication when the group communication control part automatically starts the group communication, and for reporting by the report part that a start notification has been received when the automatically started group communication ends and reporting by the report part information indicating that participation in the group communication is not stored in the storage part, and
the storage part storing data of no reply to the start notification based on a lack of generation of any input from the input part.

23. A communication control method in a communication apparatus provided with a communication part and an instruction input part and performing group communication by the communication part via a predetermined server apparatus based on a start notification when receiving the start notification of group communication by the communication part, wherein;
when the group communication ends without information transmission from the communication part in the communication apparatus itself and without input of an instruction in the instruction input part concerning of the group communication started based on the start notification, an occurence of the reception of the start notification is reported to a user; and storing data of no reply to the start notification based on a lack of generation of any input from the input part.

* * * * *